(12) United States Patent
Hindle et al.

(10) Patent No.: US 7,865,508 B2
(45) Date of Patent: Jan. 4, 2011

(54) DATA STRUCTURES AND METHODS ADAPTED FOR HETEROGENEOUS CLIENTS IN AN INFORMATION DISTRIBUTION SYSTEM

(75) Inventors: James Matthew Hindle, London (CA); Christopher John Decenzo, San Francisco, CA (US)

(73) Assignee: TVWorks, LLC, Philadelphia, PA (US)

( * ) Notice: Subject to any disclaimer, the term of this patent is extended or adjusted under 35 U.S.C. 154(b) by 469 days.

(21) Appl. No.: 11/112,738

(22) Filed: Apr. 22, 2005

(65) Prior Publication Data

US 2005/0240966 A1    Oct. 27, 2005

Related U.S. Application Data

(60) Provisional application No. 60/564,703, filed on Apr. 23, 2004.

(51) Int. Cl.
    *G06F 17/30* (2006.01)
(52) U.S. Cl. .................................. 707/736; 707/803
(58) Field of Classification Search .................. None
    See application file for complete search history.

(56) References Cited

U.S. PATENT DOCUMENTS

| | | | |
|---|---|---|---|
| 5,579,055 A | | 11/1996 | Hamilton et al. |
| 5,808,694 A | * | 9/1998 | Usui et al. .................. 725/49 |
| 5,924,091 A | * | 7/1999 | Burkhard ..................... 707/7 |
| 6,075,570 A | | 6/2000 | Usui et al. |
| 6,539,374 B2 | | 3/2003 | Jung |
| 2001/0010754 A1 | * | 8/2001 | Ando et al. .................. 386/65 |
| 2002/0088008 A1 | | 7/2002 | Markel |
| 2002/0147986 A1 | * | 10/2002 | Michael et al. ............. 725/110 |
| 2002/0191956 A1 | * | 12/2002 | Morishima et al. ........... 386/52 |
| 2002/0194597 A1 | * | 12/2002 | Barrett ...................... 725/39 |
| 2003/0041104 A1 | * | 2/2003 | Wingard et al. ............. 709/203 |
| 2003/0088876 A1 | | 5/2003 | Mao et al. |
| 2003/0212703 A1 | * | 11/2003 | Yoshioka .................... 707/102 |
| 2004/0078814 A1 | * | 4/2004 | Allen ......................... 725/47 |
| 2004/0226051 A1 | * | 11/2004 | Carney et al. .............. 725/135 |
| 2005/0141519 A1 | * | 6/2005 | Rajgopal et al. ........ 370/395.32 |
| 2007/0240186 A1 | * | 10/2007 | Silver et al. ................. 725/39 |

OTHER PUBLICATIONS

Donald E. Knuth, "The Art of Computer Programming vol. 3", Sections 6.4 and 6.5, pp. 513-579, ISBN0-201-89685-0, Apr. 1998.

(Continued)

*Primary Examiner*—Charles Rones
*Assistant Examiner*—Yuk Ting Choi
(74) *Attorney, Agent, or Firm*—Banner & Witcoff, Ltd

(57) ABSTRACT

A method includes processing data associated with event and service information to create a base data block and an index table. The base data block has an array of objects, and each object in the array may have at least one attribute. The index table also has an array of objects, and each object in the index table relates to an object in the base data block. The method of processing data may be performed by a server located at a cable headend. In one embodiment, the present invention also comprises a storage medium having a representation of a data structure produced by the data processing. In one embodiment, a STB may receive and utilize the processed data.

23 Claims, 8 Drawing Sheets

OTHER PUBLICATIONS

Cormen, Leiserson and Rivest, "Introdudion to Algorithms", Chapter 12, pp. 219-239, ISBN0-262-03141-8 and 0-07-013143-0, Jul. 2001.
U.S. Appl. No. 10/834,753, filed Apr. 29, 2004.
U.S. Appl. No. 11/038,298, filed Jan. 19, 2005.
U.S. Appl. No. 11/103,297, filed Apr. 11, 2005.

* cited by examiner

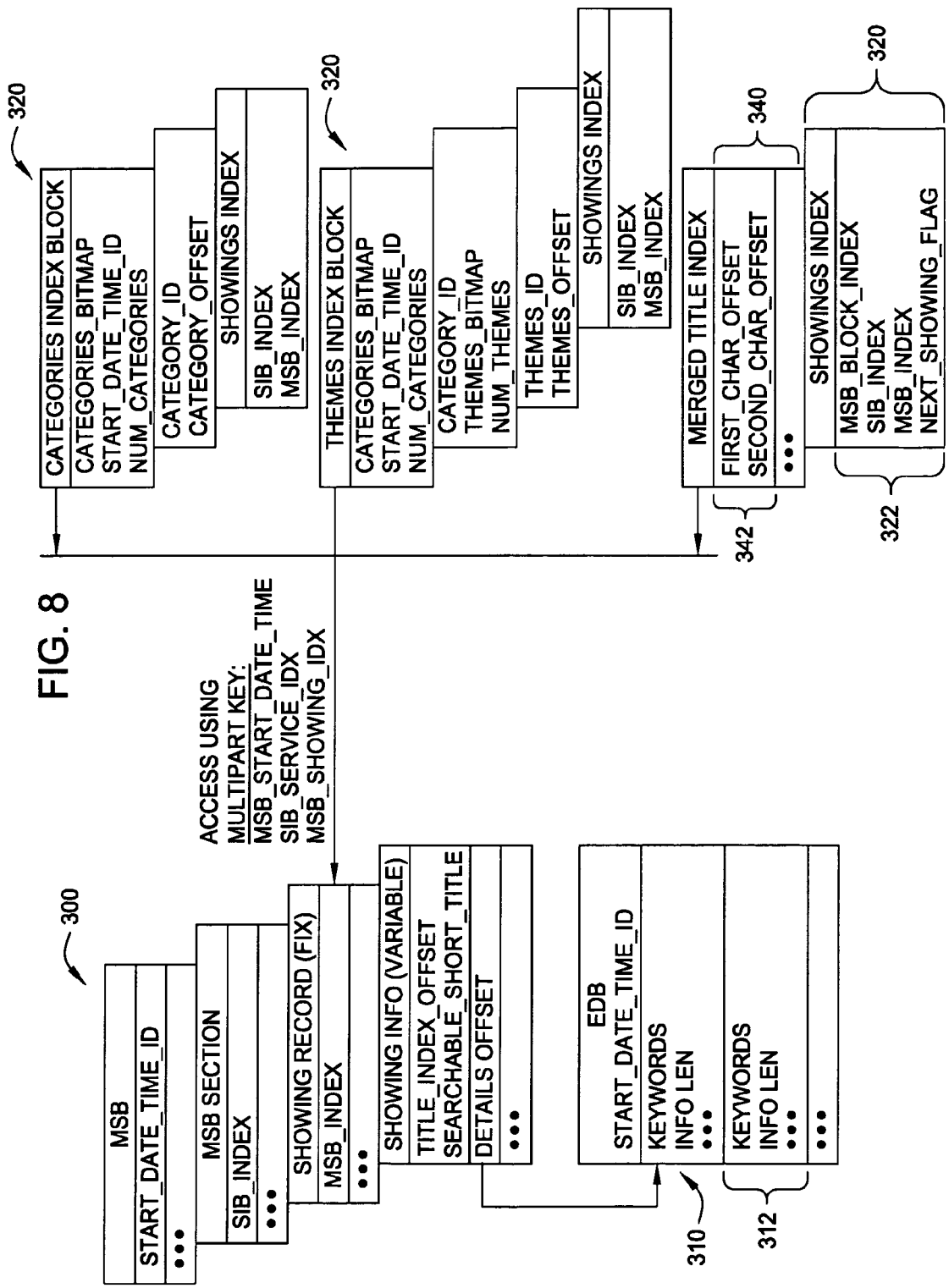

DATA STRUCTURES AND METHODS ADAPTED FOR HETEROGENEOUS CLIENTS IN AN INFORMATION DISTRIBUTION SYSTEM

CROSS-REFERENCE TO RELATED APPLICATIONS

This application claims benefit of U.S. provisional patent application Ser. No. 60/564,703, filed Apr. 23, 2004, which is herein incorporated by reference in its entirety.

BACKGROUND OF THE INVENTION

1. Field of the Invention

The present invention relates to information delivery systems and, more particularly, to efficiently providing information to clients such as set top boxes (STBs) having differing capabilities.

2. Description of the Related Art

There is a wide variance in the hardware capabilities of set top boxes (STBs) coexisting on a single radio frequency (RF) network, such as a cable television or satellite television distribution system. STBs receive data associated with, for example, an interactive program guide (IPG) application operating within a middleware environment. The data includes text-based descriptor fields for each program, such as program title, rating, description, presentation times and the like. Lower capability STBs typically are unable to perform searching and processing of such data, unlike higher capability STBs or other clients. Also, the data processing capability of STBs is typically less than the data processing capability of servers which house data before transmission to STBs. Furthermore, similar searching and processing of data is likely to be requested at a plurality of STBs.

SUMMARY OF THE INVENTION

Various deficiencies of the prior art are addressed by the present invention, one embodiment of which is a method that includes processing data associated with event and service information to create a base data block and an index table. The base data block has an array of objects, and each object in the array may have at least one attribute. The index table also has an array of objects, and each object in the index table relates to at least one object in the base data block. The method of processing data may be performed by a server located at a cable headend. In one embodiment, the present invention also comprises a storage medium having a representation of a data structure produced by the data processing. In one embodiment, a STB may receive and utilize the processed data.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 8 depicts a high-level block diagram showing another embodiment of the data structure of FIG. 3.

DETAILED DESCRIPTION

The present invention will be generally described within the context of an information distribution system that propagates content (e.g., movies, sports, television programming and the like), services (e.g., video on demand, Interactive Program Guide (IPG) services and the like) and applications (e.g., billing and other services) to clients or set top boxes associated with users. It will be appreciated by those skilled in the art that while the invention has specific utility within the context of the systems described herein, the invention has broad applicability to any system supporting client devices of varying capability.

Figure 1:
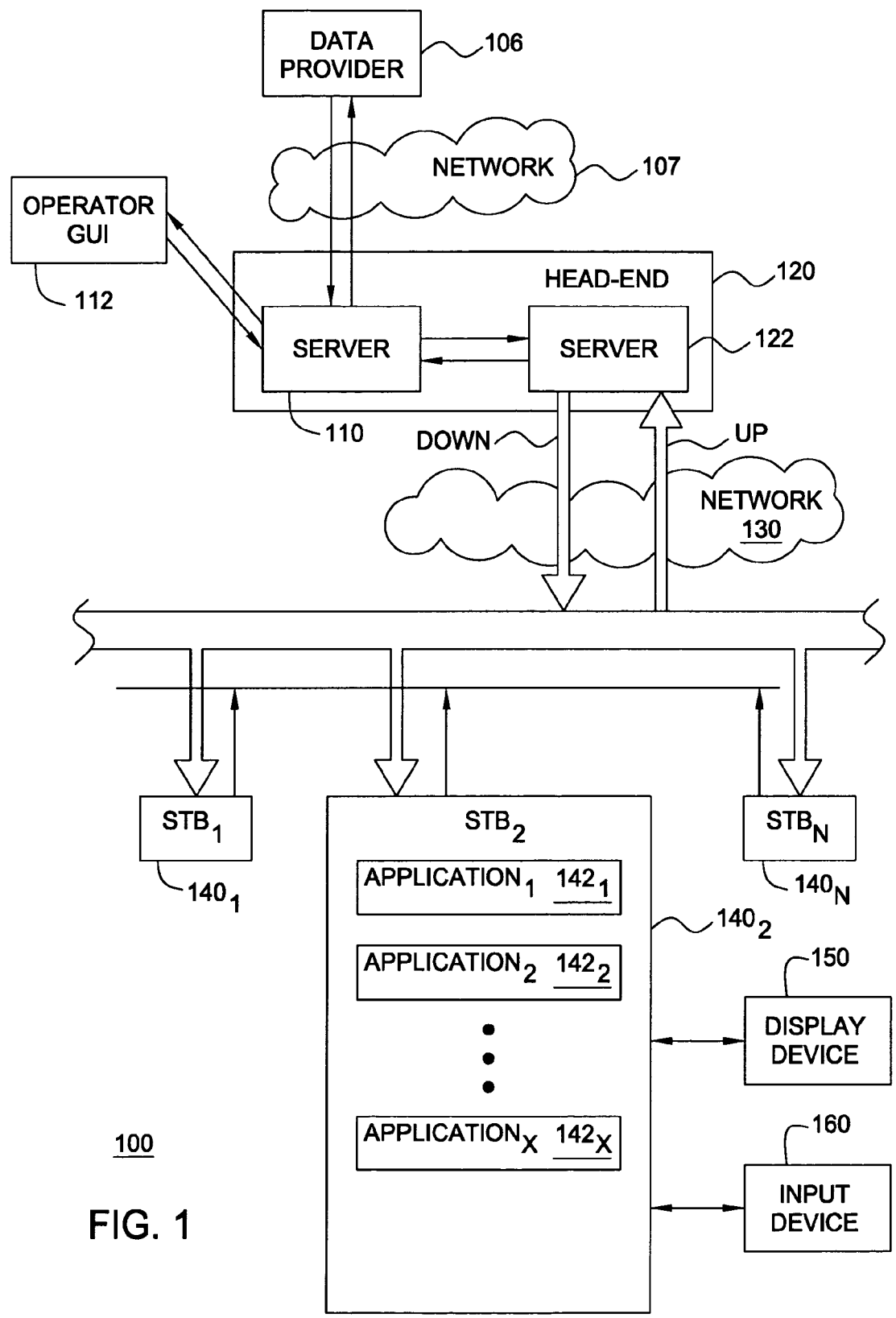
FIG. 1 depicts a high-level block diagram of an information distribution system.

FIG. 1 depicts a high level block diagram of an information distribution system 100 suitable for use with the present invention. Specifically, the system 100 of FIG. 1 comprises a head-end 120, a network 130 and a plurality of set-top boxes STBs $140^1$ through $140_N$ (collectively set top STBs 140). The head-end 120 typically also comprises an application server 122 such as, for example, the Mediacast Carousel Server as provided by Double C Technologies (Canada) Inc. of London, Ontario, Canada. Generally speaking, the server 120 operates in part to provide information to, and receive information from, the STBs 140 via network 130. The headend also comprises a server 110 which receives data from a data provider 106 through a network 107 such as, for example, the Internet. The server 110 may be, for example, a TV Asset Server as provided by Double C Technologies (Canada) Inc. of London, Ontario, Canada. The server 110 may be accessed using the operator GUI 112 for adding and monitoring data. Moreover, while depicted as implemented as a component of the headend, in another embodiment the server 110 may be implemented separately from the head-end 120.

The head-end 120 is associated with a neighborhood of STBs $140_{1-N}$. The head-end 120 operates to communicate content and other data to its neighborhood of STBs by broadcast channels received by all STBS, narrowcast channels received by some of the STBs or point cast channels received by individual STBS. The head-end 120 also interacts with the STBs 140 to establish and tear down sessions with the STBs as necessary to enable the delivery of content, information services, applications, and the like. Generally speaking, the head-end 120 operates to distribute content and other information provided by the server to the set-top boxes as appropriate, as well as return STB messages, billing information and other data to the server 120. Each STB is typically associated with a respective presentation device 150 such as a television or other video display device such as a television and a user input device 160 such as a remote control, pointing device and the like.

The head-end 120 communicates with the STBs 140 within its neighborhood via a relatively high bandwidth forward or downstream communications channel DOWN and a relatively low bandwidth reverse or upstream communications UP. The downstream DOWN and upstream UP communications channels are supported by a network topology 130, such as a hybrid fiber-coax cable television distribution system, a satellite distribution system (e.g., using a telephone network or reverse satellite link for upstream communications) and the like. While not shown in FIG. 1, an out-of-band (OOB) forward communications channel may also be supported by the network topology 130. In such an implementation of the network topology 130, control messages and other information may be supplied to the STBs 140 via in-band messaging using the downstream communications channel DOWN or via out-of-band messaging using a forward communications channel (not shown).

The STBs 140 operate to receive broadcast (to most or all STBs), narrowcast (to a region or defined group of STBs) or pointcast (to one STB, also known as a unit singlecast) information from the head-ends 120 via the network 130 using the downstream communications channel DOWN (or out-of-band forward channel).

STB 140 within the neighborhood associated with head-end 120 is depicted as including a plurality of application programs $142_1$-$142_x$ (application programs 142). The application programs 142 may comprise any of the applications used within the context of an STB 140, such as an interactive program guide (IPG) application, a VOD selection/billing application and the like.

Within the system 100 of FIG. 1, the clients or STBs 140 may comprise, illustratively, "heavy" set top boxes or "thin" set top boxes, where a heavy STB or client has significant computational and/or memory resources while a thin STB or client has constrained memory and/or computational resources. Rather than simply "heavy" or "thin" set top boxes, many more distinct classes of set top boxes may be deployed.

Figure 2:
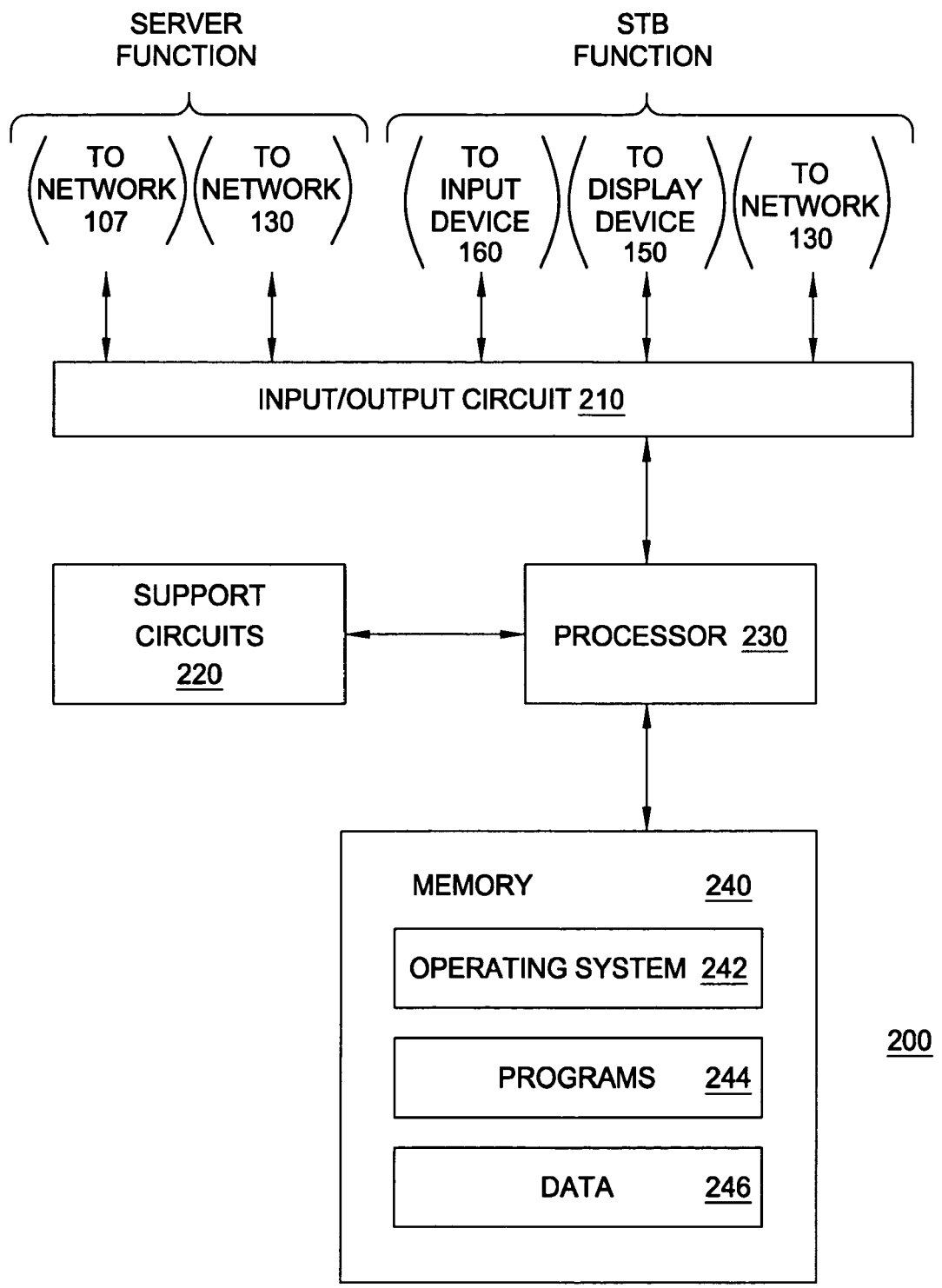
FIG. 2 depicts a high-level block diagram of a controller topology suitable for use in the information distribution system of FIG. 1.

FIG. 2 depicts a high level block diagram of a controller topology suitable for use in the system 100 of FIG. 1. Specifically, the controller 200 of FIG. 2 may be employed to implement relevant functions within the server 110, server 122, head-end 120, and/or STB 140.

The controller 200 of FIG. 2 comprises a processor 230 as well as memory 240 for storing various control programs and other programs 244 and data 246. The memory 240 may also store an operating system 242 supporting the programs 244.

The processor 230 cooperates with conventional support circuitry such as power supplies, clock circuits, cache memory and the like as well as circuits that assist in executing the software routines stored in the memory 240. As such, it is contemplated that some of the steps discussed herein as software processes may be implemented within hardware, for example as circuitry that cooperates with the processor 230 to perform various steps. The controller 200 also contains input/output (I/O) circuitry 210 that forms an interface between the various functional elements communicating with the controller 200.

Although the controller 200 is depicted as a general purpose computer that is programmed to perform various control functions in accordance with the present invention, the invention can be implemented in hardware as, for example, an application specific integrated circuit (ASIC) or field programmable gate array (FPGA). As such, the process steps described herein are intended to be broadly interpreted as being equivalently performed by software, hardware or a combination thereof.

Topologies such as depicted with respect to the controller 200 of FIG. 2 may be advantageously employed within the context of the server 110, the carousel server 122, head-end 120, network 130 and/or STB 140. That is, by utilizing appropriate operating systems 242, programs 244 and/or data 246, the topology depicted with respect to controller 200 is used to realize the functional elements discussed herein with respect to the various figures. As noted in FIG. 2, the I/O circuitry 210 communicates with network 107 as part of a server function, communicates with network 107 and network 130 as part of a head-end function, and communicates with input device 160, display device 150, and network 130 as part of an STB function.

The invention may be implemented as a computer program product wherein computer instructions, when processed by a computer, adapt the operation of the computer such that the methods and/or techniques of the present invention are invoked or otherwise provided. Instructions for invoking the inventive methods may be stored in fixed or removable media, transmitted via a data stream in a broadcast media or other signal bearing medium, and/or stored within a working memory within a computing device operating according to the instructions.

The invention may also be implemented as a data storage medium which, when accessed by a device (e.g. the STB 140), provides event and service information to the components of the device, such as for example, applications running on the device, and users of the device. The data storage medium may comprise a representation of data structures which adapt the operation of the device according to the event and service information.

In one embodiment, data received from the data providers 106 is processed by the server 110 to create data blocks that can be sent to the STBs 140, or other clients, by the Mediacast carousel server 122 over the network 130 in such a way that the data blocks can be received and stored with minimal processing overhead by the STB 140. The server 110 may receive data from the data providers 106 in a variety of formats. The data, which comprises event and service information such as, for example, TV listings and related information, as well as data related to interactive services and applications, is typically relatively large in size. However, the processing power of the STBs 140 may be relatively limited, especially when compared to the power of the server 110, or other servers available at the head-end 120.

The present invention provides for reduced processing at the STB 140 of data blocks processed by the server 110. The present invention provides compact and organized relational data to the STB 140 from the headend 120 without the STB 140 needing to process the data while accepting it. The invention allows all STBs 140 including the low-powered STBs 140 to remain responsive to user interaction while new data is being received and stored in a STB or client database. The only time the received data is examined by the STB 140 is when an application requests data, which may occur, for example, in response to a user action such as displaying a listings screen in an IPG application, or selecting a series to record in a personal video recorder (PVR) application.

A relational database management system (RDBMS) at the server 110 stores the data received from data providers 106. A process on the server 110 transforms this data into a binary format comprising data blocks. The binary format is structured so that any data element in the generated data block may be accessed directly by the STB 140. The binary format is compact and reduces the overhead of an optional data item. The presence or absence of an optional data item in the binary format is signaled by an individual bit in a common area of the format. If said bit signals the absence of the optional data item, no extra space is allocated in the binary format for the absent optional data item.

At the STB 140, data is received and accepted based on at least one of a name and a short header that uniquely identifies the data block. If the data block is accepted by the STB 140, the data block is copied from an incoming data transfer buffer to a more permanent data storage area in the STB 140. From that point on, the data does not need to be copied, and no further memory allocations are needed, to access the records contained in that block. Some blocks contain data, whereas other blocks contain indexes into data blocks. Both types of blocks are treated the same way from a memory management and data processing point of view.

In one embodiment, the server 110 creates a base data block 300 and extension data blocks 310. The base data blocks 300 comprise an array of objects 302 having an abbreviated set of attributes 304. The objects 302 comprise information relating to a particular event or service. The attributes 304 comprise individual records of information, such as for example, the name, start time, category (e.g. movie, sports, news), and the like, of a TV program. The extension blocks 310 comprise an extension array of objects 312 having an extension set of attributes 314 which provide extra detail relating to the objects 302 of the base data block 300. The extension blocks 310 comprise parallel arrays with regards to the array of the base data block 300. In one embodiment, there is a one-to-one correspondence between each object 312 in a specific extension data block 310 and an object 302 in the base data block 300. This method of organizing data is bandwidth efficient in client-heterogeneous systems in which STBs 140 have varying hardware profiles (i.e., differing capabilities in terms of processing power, memory, features and the like). This method of organizing the data allows for use of the base data blocks 300 by all types of STBs 140, while more powerful STBs 140 may also use the extension data blocks 310.

The order of the objects 302 within the array of objects 302 of the base data block 300 may be ordered according to some sorting criteria. For example, the order of the objects 302 in the array may be sorted according to unique object identifier (ID) or some other attribute 304 of the objects. For example, if the objects represent TV programs, then it is useful for an IPG application to have the TV programs sorted by start time. In the TV program example, the server 110 can generate the base data block 300 having the array of TV program objects 302 sorted by start time and broadcast the result to STBs 140 on the network 130.

In another embodiment, the base data block 300 comprises a multipart key 350 exists that identifies and provides a map to each object 302 in the array of objects 302 of the base data block 300. The multipart key comprises a plurality of keys which can be used to find certain objects 302 in the array of objects 302. In the TV program example, the multipart key may comprise a start time and a channel identifier. This multipart key will be sufficient to uniquely identify a single object in the base data block 300 from a different data block, such as an index block 320.

In one embodiment, the server 110 also generates a data block 320 which is an index table 320 which provides information relating to a different sorting order of the array of objects 302 in the base data block 300. The index table 320 comprises an array of objects 322 representing abbreviated versions of the objects 302 in the base data block 300. For example, the abbreviated objects 322 may comprise the object IDs of the objects 302 in the base data block 300 or may relate to the multipart key. The different sorting order of the array of objects 302 of the base data block 300 is provided by the order of the objects 322 in the index table 320. For example, to sort the array of TV program objects by start time and also by program name, the server 110 generates a base data block 300 having the array of objects 302 arranged according to start time and an index table 320 having an array of objects 322 arranged according to program name. The objects 322 in the index table 320 may contain only an object ID of objects 302 in the base data block 300. The objects 322 in the index table 320 do not need to include the attributes 304 according to which the objects 322 are sorted. In one embodiment there may be a plurality of index tables 320 proving a plurality of different sorting orders. The server 110 can generate the base data block 300 and index tables 320 as needed by the STB 140.

Figure 3:
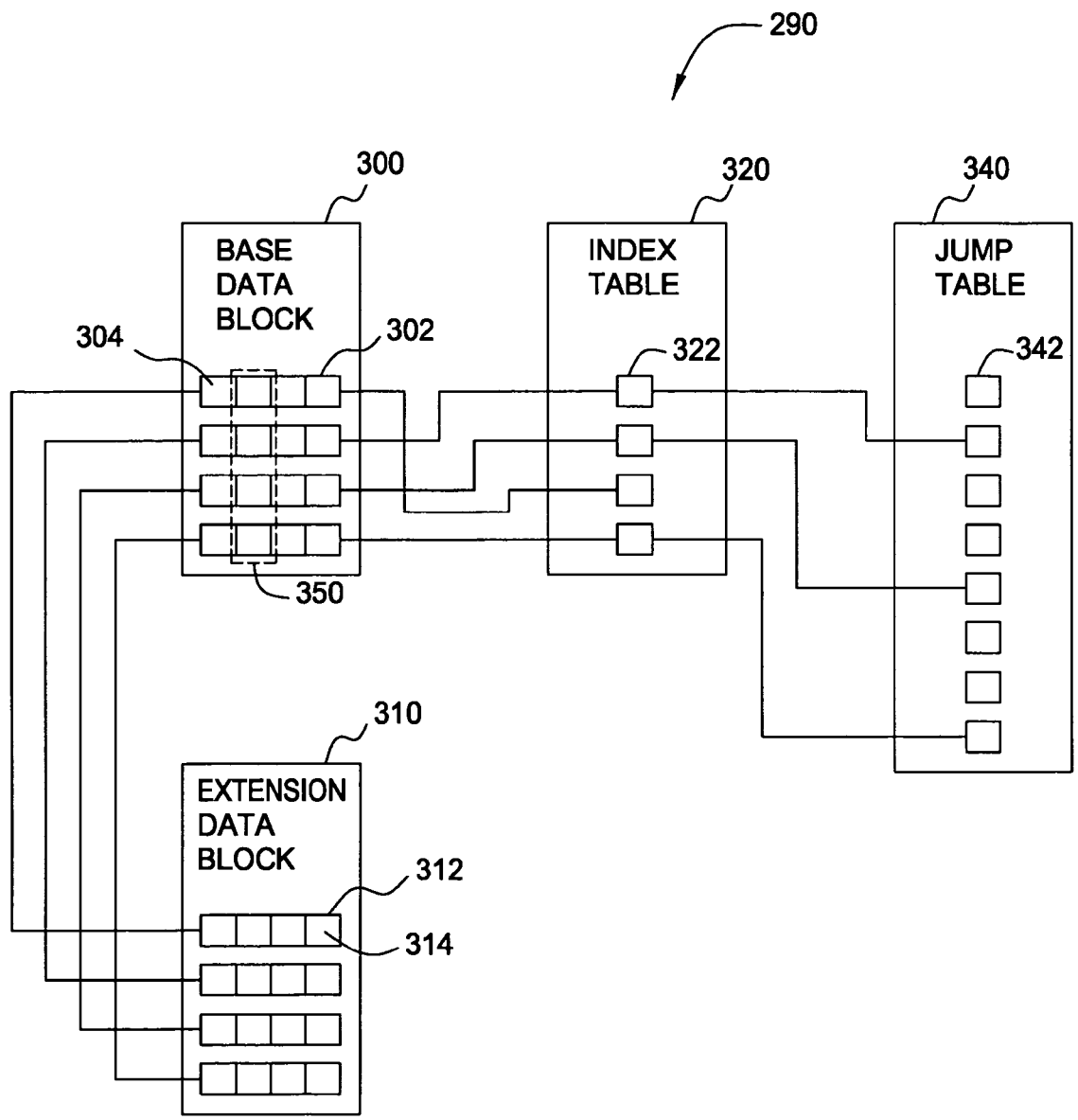
FIG. 3 depicts a high-level block diagram of one embodiment of a data structure.

FIG. 3 illustrates a high level diagram of one embodiment of the data structure 290 produced by the server 110. The figure shows high-level relationships between the base data block 300, the extension data block 310, the index table 320, and a jump table 340.

Figure 4:
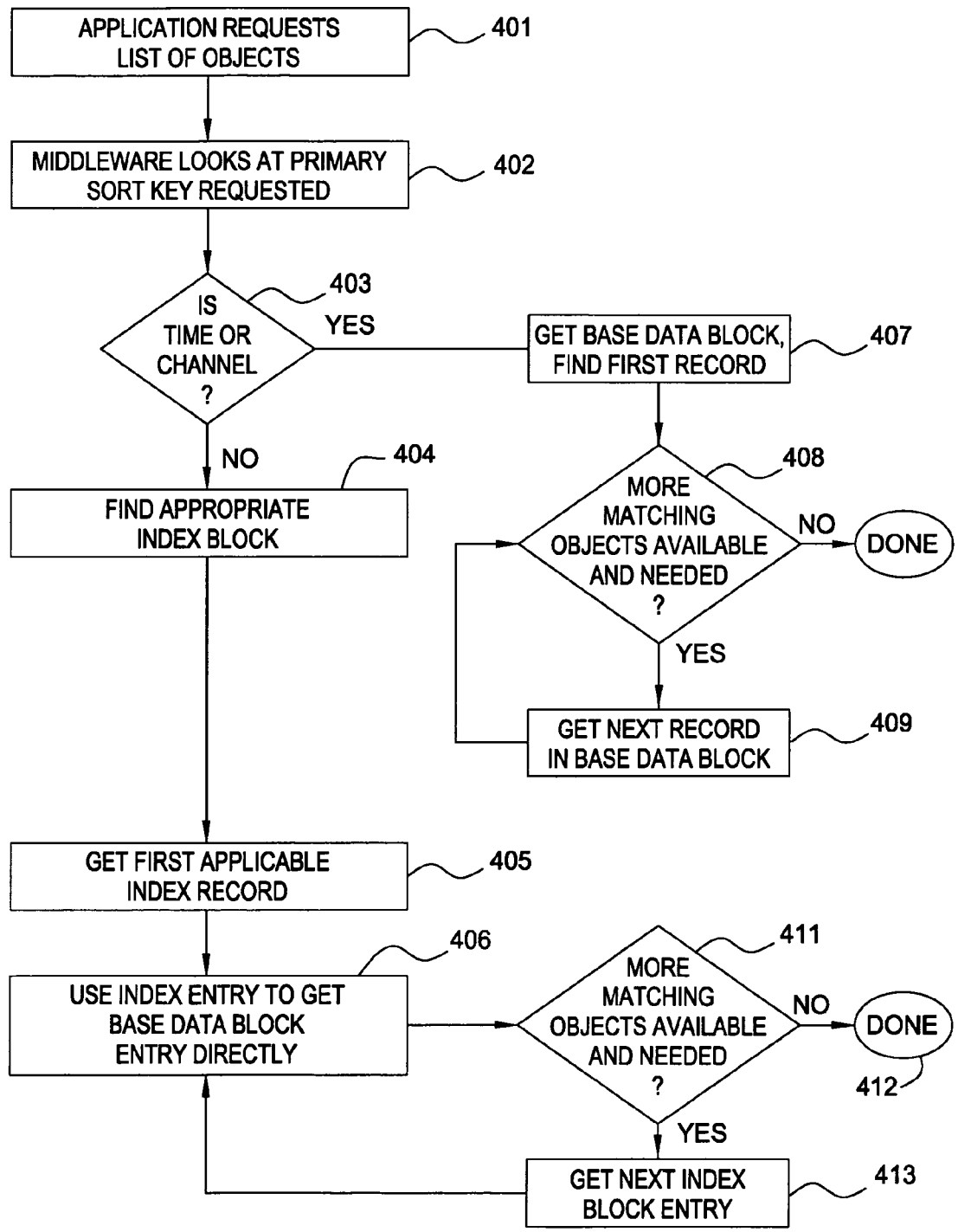
FIG. 4 depicts a flow diagram of one embodiment of a method of utilizing the data structure of FIG. 3.

FIG. 4 illustrates an exemplary embodiment of a method of utilizing at the STB 140 the data blocks 290 such as the base data block 300 and the index table 320. At step 401, an application (e.g. the IPG application) requests a list of objects 302. At step 402, a process at the STB 140, for example middleware running at the STB 140, looks at a primary sort key included in the request by the application. At step 403, the middleware decides if the primary key is one of the multipart keys 350 of the base data block 300. For example, if the multipart key 350 of the base data block 300 includes keys related to channel or start time, the middleware decides if the requested primary sort key relates to channel or start time. If the requested primary sort key is one of the multipart keys 350, the middleware retrieves the requested object 302, based on the primary sort key and the multipart key 350, from the base data block 300 at step 407. At step 408, the middleware decides if more objects 302 are needed. If no more objects 302 are needed, the method ends. If more objects 302 are needed, the middleware gets the next sequential object 302 from the base data block 300 at step 409, using the requested primary sort key and the multipart key 350.

If the middleware decides at step 403 that the requested primary sort key is not one of the multipart keys 350 of the base data block 300, the middleware retrieves a data block 320 having an index table 320 sorted according to the requested primary sort key at step 404. At step 405, the middleware retrieves the first applicable object 322 from the index table 320 based on the value of the requested primary sort key. The retrieved index entry is then used at step 406 to directly get the corresponding object 302 in the base data block 300. In one embodiment, the retrieved index table object 322 will contain only the applicable multipart key value for the base data block 300. The middleware then decides if more objects 302 are needed at step 411. If no more objects 302 are needed, the method ends, and if more objects 302 are needed, the middleware retrieves next sequential object 322 in the index table 320 at step 413 to get the next applicable multipart key value for the base data block 300.

In one embodiment, the 110 server may insert into a data block an offset 502 which has a value which points to objects 302, 312, 322, relative to the current position, in the array according to a certain criteria. In one version, offsets 502 inserted in the base data block 300 can be used to identify a subset of objects 302 in the base data block 300 having some attribute 304 in common. For example, offsets 502 can be used to identify all TV programs an array of TV program objects 302 that have a category attribute 304 having a value of sports. In this example, a first sports program object 302 has an offset 502 having a value which identifies the location of a second sports program object 302 which is the next occurrence of a sports program object 302 in the array of objects 302. In one embodiment, the offsets 502 can be implemented as attributes of objects in data blocks. In one embodiment, the server 110 may generate a data block 500 which is a table of offsets 500. Each such offset 502 in the table 500 has a value which points to the location of the first occurrence of an object 302 in the base data block 300 meeting a certain condition. In the TV program array example, such a table of offsets 500 may point to the first occurrences of a sports program, a news program, a movie, and the like. In one embodiment, the table of offsets 500 may be integrated into the base data block 300 such that the table of offsets becomes part of the base data block 300. For example, the table of offsets 500 may be prepended to the base data block 300 to form one data block suitable for transmission to the STB 140. In one embodiment, the server 110 may also generate a data block 320 comprising an index table 320 having offsets 502. For example, an index table 320 providing a sorting by time of TV program objects 322 could further contain offsets 502 indicating the first location in the array of a TV program object 322 with a specific start time.

Figure 5:
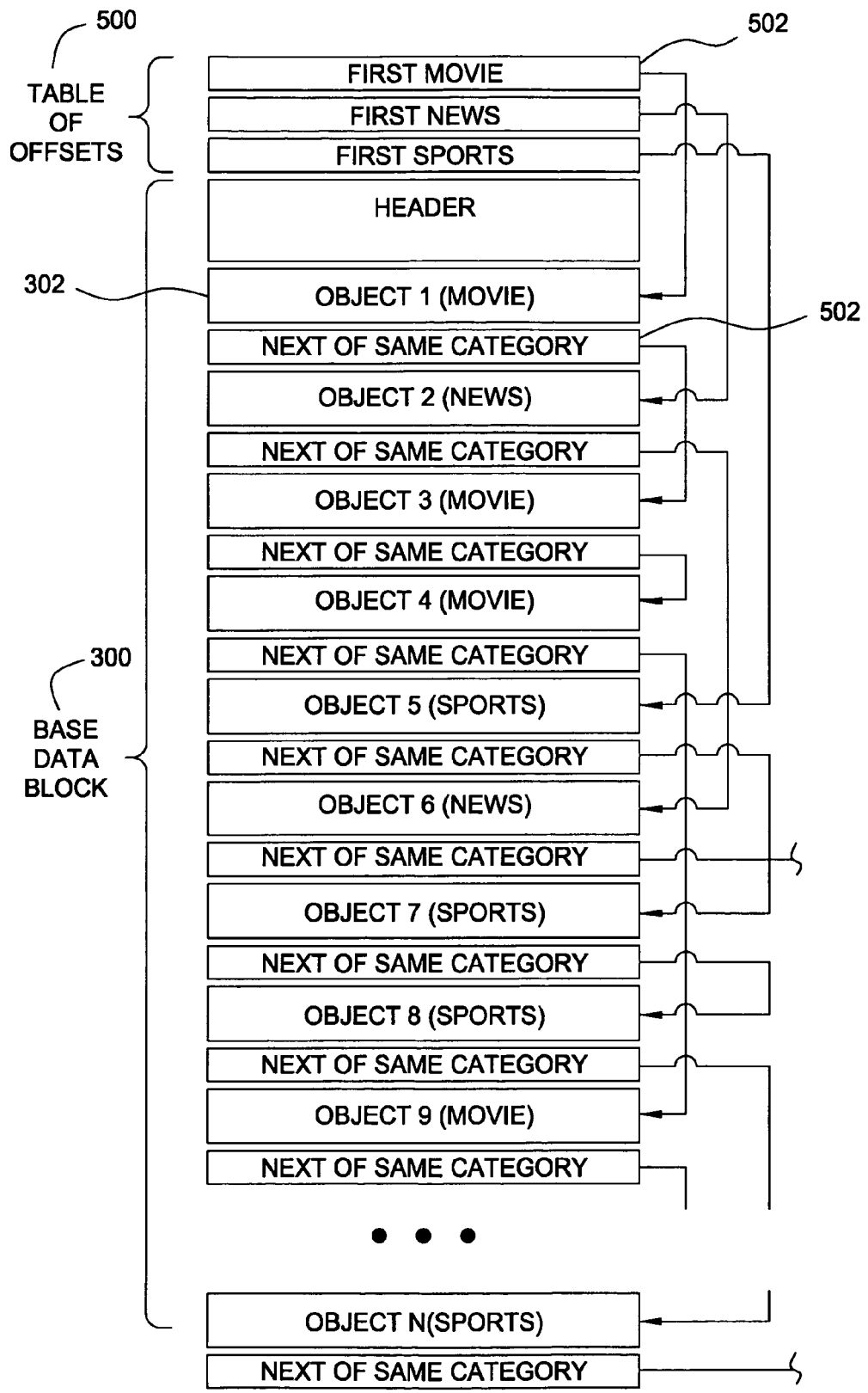
FIG. 5 depicts a high-level block diagram of another embodiment of the data structure of FIG. 3.

FIG. 5 depicts a high level block diagram of a table of offsets 500 and a base data block 300 having offsets 502. The table of offsets 500 contains offsets 502 to the first occurrences of a movie, a news program, and a sports program. The base data block 300 comprises program objects 302 which may each include a base set of attributes 304. Also as illustrated in FIG. 5, associated with each base data block object 302 is an offset 502 to the next occurrence of an base data block object 302 having the same object type, for example to the next movie in the case of object 1.

In one embodiment, offsets 502 have a value which indicates the relative distance within the array, from a certain object, to find the next object in the desired subset. Using a relative offset 502 is efficient, both in terms of array size and search time. By using a relative offset 502, the number of bits required for the offset 502 can often be less than might be required for an absolute offset 502, reducing the overall size of the array. The choice of what units in which to express the offset 502 can depend upon whether the objects are of fixed or variable size. For example, in one version the offset 502 is expressed in terms of the number of objects to count forward in the array. In another version, the offset value is expressed in terms of the number of bytes to count forward in the binary format of the array.

In one embodiment, the server 110 also generates a data block 340 which is a jump table 340 which can be used in conjunction with an index table 320 to enable quick lookups of objects 302 in the base data block 300. The jump table 340 provides a map to a location, if such a location exists, within an index table 320 of an object 322 which is a representation of an object 302 in the base data block 300, the object 302 comprising an attribute 304 having a value which at least one of (i) exactly matches an attribute value to which a jump is desired and (ii) has a prefix that exactly matches an attribute value to which a jump is desired. The jump table 340 comprises objects 342 arranged according to a hash of a character set. The character set represents the possible characters of the value of attribute value according to which it is desired to jump. Each object 342 in the jump table 340 comprises an iteration 344 of the character hash and an offset 346 which indicates the location in the index table 320 of the object 322 which is a representation of the object 302 comprising an attribute having a value as described in (i) and (ii) above in this paragraph, if such a location exists. If such a location does not exist, the value of the offset indicates that no such location exists. The hash of the character set produces $n^x$ objects 342, wherein n is the size of the character set and x is the number of characters of the attribute value prefix for which jumps are desired.

Figure 6:
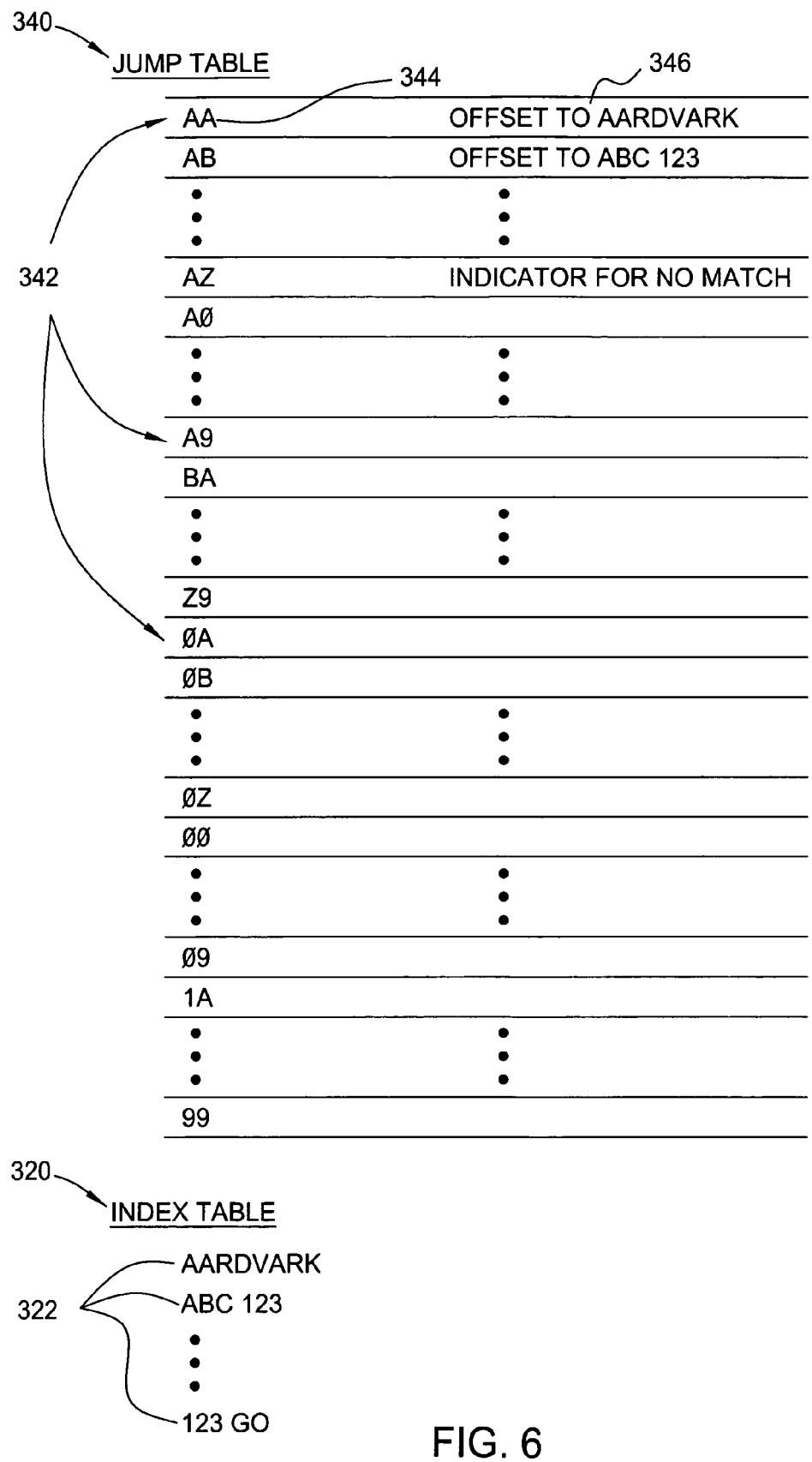
FIG. 6 depicts an embodiment of a jump table and an index table of the data structure of FIG. 3.

For example, the jump table 340 for program titles might consist of n=36 if all program titles contained just alphabetic characters (26) and numbers (10), and x=2 if it is desired to improve performance on lookups of program titles beginning with any 1 or 2 character sequence. FIG. 6 illustrates an exemplary jump table 340 and corresponding exemplary index table 320. The jump table offsets 346 pointing to locations into the index table 320 may be absolute offsets 346, such as a number of bytes or objects 322 into the index table 320, or relative offsets 346, such as the number of bytes or objects 320 after an earlier offset 346. For example, the $36^2$ program title jump table 340 may contain an absolute offset 346 into the index table 320 for the first character sought, and a relative offset 346 from that first character sought to the second character. For example, if the search is for program titles beginning with "ch", then the offset 346 which points to the location of program titles beginning with first character "c" may be absolute while the offset 346 which points to the location of program titles beginning with first two characters "ch" might be a 10 object relative offset 346 from the location pointed to by the first character "c" offset 346.

In one embodiment, a subset of objects 302 in an array of objects 302 of the base data block 300 can be found using an index table 320 and a jump table 340. The method comprises determining, using the jump table 340, the location of the first object 322 in the index table 320 having an attribute value that matches the desired first x characters. This location may be denoted as the first location. A new string of characters is then constructed, the new string consisting of the first x characters but with the character at location x replaced with the next character in the sorting order (e.g. "m" becomes "n" in alphabetic sorting order). The location of the first object 322 in the index table 320 that has an attribute value that matches this new string is then determined. This location may be denoted as the second location. All objects 322 in the index table 320 starting with the first location and ending immediately before the second location are then collected. The resulting collection is the subset of objects 322 having an attribute value having the first x characters matching the desired target value.

For example, to locate the subset of program titles beginning with the characters "ch", this method would first determine the location of the first program title beginning with the characters "ch" in the index table 320 using the $36^2$ jump table 340. The method would then construct a new string based upon "ch" but with the second character replaced by the next character in the sorting order, i.e. the next prefix in the character hash. In the example, the new string would be "ci". Next, this method would determine the location of the first program title beginning with the characters "ci" in the index table 320 using the $36^2$ jump table 340. If there are no program titles beginning with the characters "ci", then the value of the offset 346 indicates that no such titles exist. In this case, a new string would be constructed, the new string being the next logical prefix, and in the example this would be "cj", and the method would determine the location of the first program title beginning with the characters "cj" in the index table 320 using the $36^2$ jump table 340. This process would be repeated until a valid second location is located. Finally, this method would extract all program ids in the index table 320 between the first and second locations, and the result would be the desired subset of programs having a program title beginning with the characters "ch".

Figure 7:
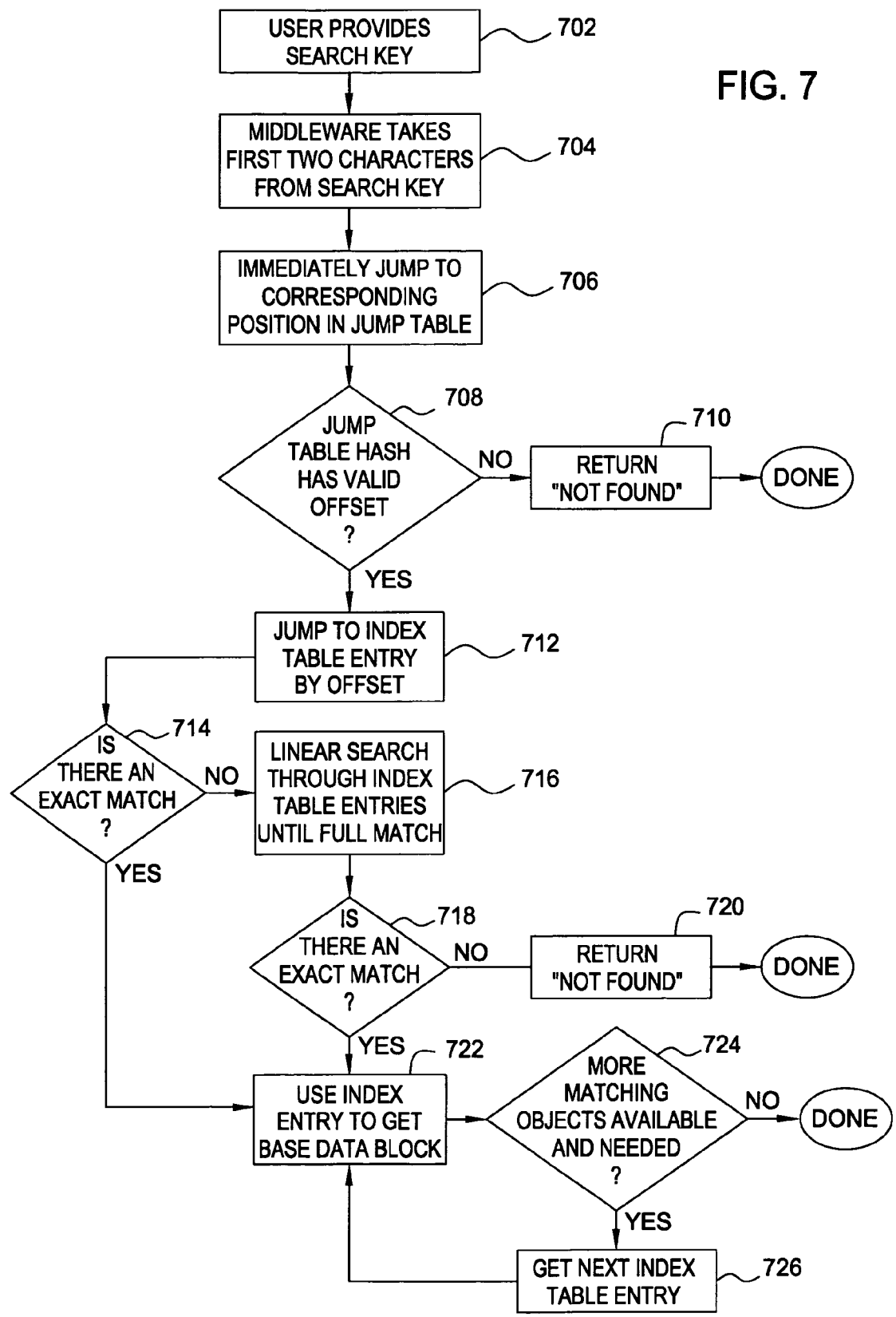
FIG. 7 depicts a flow diagram of one embodiment of a method of utilizing the data structure of FIG. 3.

FIG. 7 illustrates a flow diagram of a method of utilizing the jump table 340 and the index table 320 to locate objects 302 in the base data block 300. At step 702 the STB 140 is provided a search key, for example by a user of the STB 140. At step 704, a process at the STB 140, for example middleware running at the STB 140, determines the first two characters from the search key. At step 706, the middleware jumps to the corresponding position in the jump table 340 using the character hash of the jump table 340. At step 708, the middleware determines if the applicable object 342 in the character hash of the jump table 340 has an offset 346 which points to a location in the index table 320. If the jump table object 342 does not have an offset 346 which points to a location in the index table 320 for that instance 344 of the character hash, then the offset 346 indicates that no such location exists, and the middleware returns that the search key is not found at step 710.

If the jump table 340 has an offset 346 for that instance 344 of the character hash which points to a location in the index table 320, the middleware jumps to the index table object 322 indicated by the offset 346 at step 712. This location within the index table 320 comprises an object 322 which is a representation of an object 302 comprising an attribute having a value which at least one of (i) exactly matches an attribute value to which a jump is desired and (ii) has a prefix that exactly matches an attribute value to which a jump is desired. At step 714, the middleware decides if there is an exact match between the desired full attribute value and the attribute value of the object 302. If there is an exact match between the desired full attribute value and the attribute value of the object 302, the method proceeds to step 722. If there is only a match between the instance of the character hash and the prefix of the attribute value to which a jump is desired, at step 716 the middleware conducts a linear search through the base data block objects 32, starting at the location indicated by the jump table 340 and the index table 320, for a full match to the search key. At step 718, the middleware decides if such an exact fully match exists. If such a full exact match does not exist, the middleware returns that the search key is not found at step 720. If such a full exact match does exist, the method proceeds to step 722.

At step 722, the middleware retrieves, using the object 322 indicated by the jump table 340, the object 302 from the base data block having the attribute value matching the search string. At step 724, the middleware decides if more objects 302 are needed. If no more objects 302 are needed, the method ends. If more objects 302 are needed, the middleware gets the next applicable object from the index table 320 at step 726 and then proceeds to step 722.

In one embodiment, the jump table 340 may be integrated into the index table 320 such that the jump table 340 becomes part of the index table 320. For example, the jump table 340 may be prepended to the index table 320 to form one data block suitable for transmission to the STB 140.

In one embodiment, a method for data block generation is to first organize the set of desired extension data blocks 310 by object type and associate each resulting set with the base data block 300 for that object type. Then, for each base data block 300, the set of attributes 304 requested in a database query to generate the base data block 300 is extended to include those attributes 314 belonging in the extension blocks 310 for that associated object type. Finally, upon performing the database query for each base data block 300, the results of the query are passed to a block generation subsystem to generate both the base data block 300 as well as each extension block 310 for the given object type. Thus, the base data block 300 as well as the set of extension blocks 310 can be generated for a given object type from a single database query.

In one embodiment, the server 110 uses a time span convention for organizing and scheduling the generation of data blocks, and for deciding what goes into a given block. The server 110 may choose the time span for a given block based upon the nature of the block and object type and the corresponding needs of a client application. The server 110 may further group data blocks by their time span convention. The time span convention consists of a starting time and a time period. Objects with a live scheduling during the given period would belong in the block. A time span convention of 12:00 AM Feb. 9, 2004 and a 2 day period for TV programs would mean all TV programs scheduled for broadcast between 12 am Feb. 9, 2004 and 12 am Feb. 11, 2004 belong in the first block. A subsequent block with a convention of 12 am Feb. 11, 2004 and 2 day period would contain all TV programs scheduled for broadcast during that time period.

The choice of the time span for a given data block is based upon the nature of the block and object type and the needs of the client application. For base data blocks 300 and extension data blocks 310, due to their relatively larger size per object, a client IPG application may prefer a smaller time span period and swap blocks in and out memory storage to access different time span periods. For index blocks 320, due to their smaller size per object, a client IPG application may prefer a longer time span period. Conversely, for index blocks 320 that are indexed by time, despite the smaller size per object, a client IPG application may prefer a smaller period in order to more frequently swap out expired data making room for more current blocks.

In one embodiment data blocks can be grouped by their time span convention such that different blocks with the same time span period can have their start times coordinated, especially in the case where they share the same object type. The result is that the time span start time for base data blocks 300 and extension data blocks 310, allowing the client access to a predictable set of corresponding blocks. For TV programs, this could mean that the server generates a set of TV program base data blocks 300, their extension data blocks 310, and the by-time and by-channel abbreviated index blocks 320 all covering the same set of TV programs; those TV programs scheduled for a specific time span such as 2 days beginning on Feb. 9, 2004. A subsequent set of the same blocks could also be generated by the server covering the 2 day time span beginning on Feb. 11, 2004. A different set of blocks generated by the server could include the by-title, by-actor-name, and by-series abbreviated index blocks 320 covering a 14 day time span beginning on Feb. 9, 2004. A subsequent set for these blocks could be generated for the 14 day time span beginning on Feb. 23, 2004, or alternatively Feb. 10, 2004, depending upon how often the client IPG application wants these blocks updated.

The various documents included herein depict multiple embodiments of several different inventions. These inventions may be used individually or in combination. Generally speaking, the various techniques, methods, apparatus, data structures, computer program products and the like are well adapted for use within a client environment within, for example, an interactive information distribution system 100 such as a cable television or satellite television delivery system. Of particular concern in such a system is the limited resources available for processing, storage and the like. Various embodiments of the invention provide techniques well suited to the task of enabling advanced functionality within such a resource constrained environment. Where the environment is less constrained (i.e., a "heavy" set top box 140 and the like), the techniques described herein provide additional benefits in terms of control, security and improved delivery of services.

In one embodiment of the invention, data blocks are interleaved as multiple linked lists. That is, various filters are interleaved as multiple linked lists to improve delivery, and as depicted in FIG. 5.

In another aspect of an invention, all channel data is put on multiple channel addresses. Given a client side memory capable of storing 300 channels of content information (i.e., program guide information) for a three day time period, such resources will also support approximately 100 channels of content information for a 7-day time period.

In another aspect of an invention, the data blocks include broadcast and video-on-demand and recorded personal video recorder (PVR) data. In this embodiment, a single JAVA content search call brings a mixed return of content matching search criteria, whether such content is from a broadcast source, video-on-demand source or previous recorded content within a PVR.

In another aspect of an invention, into the data blocks may be inserted channel logos such as graphics to display with the listings such that an IPG user interface may include channel logos and graphics. For example an extension data block 310 may support such logos and graphics. In one embodiment, an extension block 310 may includes pointers which provide address information enabling a processor to identify an appropriate memory location and extract therefrom logo or graphic information associated with a particular listing.

Exemplary Data Format

For illustrative purposes, below is described one example of a format suitable for use for data blocks generated according to the present invention.

In the example, a Services Database (SDB) provides the data and APIs to access that data needed to implement an IPG or other application providing information about programs. The following example presents a database wire protocol (DBWP), which is a format for delivering the data to set top boxes according to the present invention. The DBWP allows any number of clients to access the system without increasing the downstream bandwidth required. It is carried over the Mediacast signaling protocol (MSP) format and has extra header information to communicate specific database information about the data in the block to the set top box 140. While designed to optimize the transport and use of listings data, the design is flexible enough to allow any application data to be carried and queried.

The DBWP will carry different types of record blocks that are indicated by the record type field. These different records will include database maintenance, showings information block, indexes for access by category, subcategory and title, channel information, and event details. Records themselves are variable length and can be used directly by the client as memory mapped structures.

Each record block carried by the DBWP is encapsulated inside DBWP blocks; each block has a common header.

It is intended that the client will cache portions of the broadcast DBWP data and will satisfy normal queries with the DRAM cached data. Depending on the memory available on the set top box, portions of data available to the server will not be able to be cached locally. If that data is requested, we may be able to retrieve it on demand from either the MSP server or from an interactive request of the TVAsset server.

The main blocks described are for carrying data necessary to provide an IPG type application. There is a fixed relationship between a number of these blocks and how they may be used in concert to access data efficiently. The description of each block in the appropriate section describes these relationships in detail.

In one example, different blocks can be stored in DRAM for both a resource constrained box such as the Motorola DCT-2000 and a higher end box such as the Motorola DCT-5100. While there may be 7 full days of information available on the network, the low end box will only store 1 day of details and 4 days of showings information and indexes. It should be noted that the size of the merged titles block should match the number of days of showings information in the low end configuration. Furthermore, there should be a one-to-one relationship between the number of days of showings information and the number of days of index information.

It is hereby noted that many of the tables used herein below to describe the content of data blocks do so by using a syntax format, in which the data included in the block is generally indicated in bold, and is accompanied by logical constructions used to describe which pieces of data are included in the block and on what conditions.

DBWP Blocks

All DBWP objects are transported within DBWP blocks. DBWP blocks are assembled into Database objects. The maximum size of a DBWP block is variable, depending on the underlying protocol. The DBWP block header is designed for maximum efficiency of data assembly on the client side, not to minimize network bandwidth use.

The actual blocks will be carried over the broadcast carousel in MSP format. The MSP layer is responsible for assembling the individual MPEG packets into the complete DBWP object. Once the client receives the object from the MSP, the MSP header will be stripped away and we'll be left with the DBWP object which always begins with a DBWP header.

Since the data is to be used directly from memory, it is sometimes necessary to include padding bytes that align the next field or structure on a particular boundary (typically a four byte boundary). When it is needed in a structure it will be referenced as 'pad( )' and it follows the syntax shown in Table 1, where n is greater than or equal to zero and less than four depending on the current position in the data structure:

TABLE 1

Syntax of the pad

| Syntax | No. of bits |
|---|---|
| pad( ) = {<br>  for (i=0;i<n;i++) {<br>    pad_byte<br>  }<br>} | 8 |

Table 2 shows the syntax of a DBWP block.

TABLE 2

Syntax of the dbwp_block

| Syntax | No. of bits |
|---|---|
| dbwp_block( ) = {<br>  length<br>  magic<br>  dbwp_version<br>  reserved_1<br>  CRC_present_flag<br>  interactive_response_flag | 32<br>4<br>4<br>1<br>1<br>1 |

TABLE 2-continued

Syntax of the dbwp_block

| Syntax | No. of bits |
|---|---|
| interactive_response_more_available_flag | 1 |
| object_scope | 4 |
| if (interactive_response_flag == 1) { | |
|     original_request_id | 3 |
|     total_responses_available | 13 |
| } else { | |
|     object_id | 16 |
| } | |
| object_version | 8 |
| object_type | 8 |
| for (i = 0; i < N; i++) { | |
|     data_byte | 8 |
| } | |
| if (CRC_present_flag==1) { | |
|     CRC | 32 |
| } | |
| } | |

The fields present in the DBWP block are described as follows:

length—A 32-bit field specifying the number of bytes of significant data in this block immediately following this field. This length will be limited by the underlying protocol.

magic—Can be used to verify that the block is actually a DBWP block. It should always be 0x7.

dbwp¯version—Indicates the version of the DBWP protocol used in this block. This document describes DBWP version 1.

CRC_present_flag—Indicates that there is a CRC value following the data bytes.

interactive_response_flag—Indicates that this block is a response to an interactive request not a broadcast block.

interactive_response_more_available_flag—Only valid if interactive_response_flag is set. It indicates that there are more records available following the last record in the block. There may be an indication of how many records are available in the total_responses_available field.

object_scope—Multiple versions of the same object ID may exist in the transport. In this case, a 'priority' can be resolved by comparing the object_scope fields. In general the lower the scope number the lower the priority. So a national/system-wide object would have a scope value of 0x0, while the same object at a headend level would have a higher object scope value (0xA, for example). We provide for up to 16 different levels of priority.

original_request_id—Includes the original request id so the client can match the response to the request.

total_responses_available—If the server is able to determine the total number of records that match the query criteria, that number should be in this field. If this number can't be determined, a value of 0x1FFF should be set.

object_id—A 16-bit field which uniquely identifies the object within the set of database objects that are currently being broadcast by this server. The value of 0 for this field is reserved.

object_version—The version number of the block. To construct an object, all of the blocks collected must have the same value for this field.

object_type—An 8-bit field specifying the type of object of which this block is a part. The values of object_type are specified in Table 1-3.

data_byte—Data bytes shall be contiguous bytes of data that describe the actual database object or message. How they are interpreted depends on the object_type field.

CRC—A 32 bit CRC value used to verify the integrity of the DBWP block when received by the client. The CRC uses the standard MPEG CRC polynomial and is calculated over the data from the length field to the end of the data bytes.

Table 3 shows a possible set of object type assignments.

TABLE 3

Object type assignments

| Value | Description |
|---|---|
| 0x00 | Control Block |
| 0x01 | Services Information Block |
| 0x02 | Master Showings Block |
| 0x03 | Events Details Block |
| 0x04 | PPV Block |
| 0x05 | By Theme Index Block |
| 0x06 | By Title Index Block |
| 0x07 | By Series Index Block |
| 0x08 | Data Extension Block |
| 0x09 | Message Block |
| 0x0A | Package Block |
| 0x0B | Application Block |
| 0x0C | Names Block |
| 0x0D | Reverse Names Block |
| 0x0E | Interactive Index Block |
| 0x0F | Channel Lineup Block |
| 0x10 | Filter Control Message |
| 0x11 | Merged Title Index Block |
| 0x12 | Categories Index Block |
| 0x13 | Packages Index Block |
| 0x14 | Merged Generic User Index Block |
| 0x15 | Generic User Index Block |
| 0x16-0xCF | Reserved for future use |
| 0xD0 | VOD Multitype Block |
| 0xD1 | VOD Core Block |
| 0xD2 | VOD Asset Details Block |
| 0xD3 | VOD Category Details Block |
| 0xD4 | VOD Package Details Block |
| 0xD5 | VOD Error Block |
| 0xD6-0xFF | Reserved for future use |

Master Showing Block 300

The Master Showing Block (MSB) 300 is the core block of information describing broadcast programming. It contains enough information about programs to display information in a typical grid or 'channel surfing bar' user interface. For efficiency, the server will not use a compression type on the event record as that will slow down access to the short title.

The MSB 300 describes all the programming for its time block. While not explicitly required by the specification, each MSB block 300 in TVNavigator 5.2 will contain programming for all of the services described in the SIB, therefor there will be exactly one MSB 300 per time block. The programming for each service is in its own MSB section. These sections should appear sorted by SIB service index. Within each section there is a fixed size data area describing all the programming for the time block followed by a descriptors pool which contains the variable sized data. The order of the showings within the MSB block 300.

TABLE 6

Syntax of the master_showings_block

| Syntax | No. of bits |
|---|---|
| master_showings_block ( ) = { | |
|     start_date_time_id | 12 |
|     reserved | 4 |
|     msb_num_sections | 16 |
|     for (i = 0; i < msb_num_sections; i++) { | |
|         msb_section ( ) | |

TABLE 6-continued

Syntax of the master_showings_block

| Syntax | No. of bits |
|---|---|
|    } | |
| } | |

The Master Showings block fields are described as follows:
start_data_time_id—An id for the time block being described. This is an index into the year, so, for example, if the time_block_length is 24, then this value is the day number of the year with January $1^{st}$ being 1 and December $31^{st}$ being either 365 or 366 depending on if the year is a leap year. Similarily if time_block_length is 6 then this value indicates how many 6 hour blocks into the year this block represents.

Table 7 shows the syntax of the MSB section.

TABLE 7

Syntax of the msb_section

| Syntax | No. of bits |
|---|---|
| msb_section( ) = { | |
|   reserved | 3 |
|   negative_start_time_flag | 1 |
|   sib_index | 12 |
|   msb_section_length | 16 |
|   number_of_showings | 8 |
|   for (int i=0;i<number_of_showings;i++) { | |
|     start_time_msb_offset | 11 |
|     showing_info_descriptor_length | 6 |
|     showing_attributes | 7 |
|     showing_attributes_ID | 8 |
|   } | |
|   for (int j=0;j<number_of_showings;j++) { | |
|     if (showing_info_descriptor_length==2) { | |
|       showing_info_indirect_descriptor | 16 |
|     } else { | |
|       showing_info_descriptor( ) | |
|     } | |
|   } | |
| } | |

The MSB Section fields are described as follows:
negative_start_time_flag—If the showing that is on air for this service at the start of this time block started before this time block, we still include it but set this flag. We do this so that we can safely drop the MSB for the previous time block as soon as it expires without losing the information about programming that straddles the MSB time blocks. If set, the start_time_msb_offset is treated as a negative value.

sib_index—Indicates for which service this msb section is providing programming information as a 0-based index into the services information block (SIB).

msb_section_length—The number of bytes that comprise this entire msb_section.

number_of_showings—The number of showings described in this msb_section.

start_time_msb_offset—An offset in minutes from the MSB start date/time for this showing.

showing_info_descriptor_length—The number of bytes that comprise the variable data portion of this showing. If it is 2, it implies there is just an indirect descriptor which means this program was on at an earlier time within this time block on this service.

showing_attributes—The value should be interpreted according to the following table:

| Attribute name | Bit Number |
|---|---|
| Part of Package | 0 |
| Private_showing_attribute_1 | 1 |
| Private_showing_attribute_2 | 2 |
| Private_showing_attribute_3 | 3 |
| Private_showing_attribute_4 | 4 |
| Private_showing_attribute_5 | 5 |
| Reserved | 6 | showing_attributes_ID—The value should be interpreted according to the following table:

| | | | | | | | | Bit Number | | | | | | | |
|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | ... | 31 |
| | | | | | | | | Attribute Name | | | | | | | |
| Attribute_ID | PPV | Black-out | Live | Taped | Re-peat | New | Re-served | Re-served | Re-served | Re-served | Re-served | Re-served | Re-served | Re-served | ... | Re-served |
| 0 | 1 | | | | | | | | | | | | | | | |
| 1 | 1 | 1 | | | | | | | | | | | | | | |
| 2 | 1 | | 1 | | | | | | | | | | | | | |
| 3 | 1 | | | 1 | | | | | | | | | | | | |
| 4 | 1 | | | | 1 | | | | | | | | | | | |
| 5 | 1 | | | | | 1 | | | | | | | | | | |
| 6 | 1 | 1 | 1 | | | | | | | | | | | | | |
| 7 | | 1 | | | | | | | | | | | | | | |
| 8 | | 1 | 1 | | | | | | | | | | | | | |
| 9 | | | 1 | | | | | | | | | | | | | |
| 10 | | | | 1 | | | | | | | | | | | | |
| 11 | | | | | 1 | | | | | | | | | | | |
| 12 | | | | | | 1 | | | | | | | | | | |
| . | | | | | | | | | | | | | | | | |
| . | | | | | | | | | | | | | | | | |
| . | | | | | | | | | | | | | | | | |
| 255 | | | | | | | | | | | | | | | | | showing_info_indirect_descriptor—The number of bytes to skip from the beginning of the showing_descriptor pool backwards to reach the showing_info_descriptor for this program. This implies that the program being described was already described earlier in the block so we are saving space by just referencing the information indirectly on subsequent airings of the same program.

Table 8 shows the syntax of the showing info descriptor.

TABLE 8

Syntax of the showing_info_descriptor

| Syntax | No. of bits |
|---|---|
| showing_info_descriptor( ) = { | |
|   details_record_offset | 17 |
|   category_id | 3 |
|   special_duration_flag | 1 |
|   MPAA_rating_id | 3 |
|   star_rating_id | 4 |
|   content_warnings_flag | 1 |
|   TV_rating_id | 3 |
|   subcategory_id | 7 |
|   reserved_1 | 1 |
|   short_title_length | 5 |
|   if (special_duration_flag==1) { | |
|     duration_code | 3 |
|   } else { | |
|     duration_in_minutes | 11 |
|   } | |
|   if (content_warnings_flag==1) { | |
|     num_content_warnings | 8 |
|     for(int i=0;i<num_content_warnings;i++) { | |
|       content_warning_id | 8 |
|     } | |
|   } | |
|   for (int j=0;j<short_title_length;j++) { | |
|     short_title_char | 8 |
|   } | |
|   title_index_offset | 8 |
|   searchable_short_title | variable |
| } | |

The Showing Info Descriptor fields are described as follows:

details_record_offset—Number of bytes that should be skipped from the beginning of the corresponding event details block to get to the first byte of data for this program.

Category_id—The category of showings. This value is interpreted against the categories codes, using category/subcategory definition control message.

special_duration_flag—If set, it indicates that the duration of this program is one of the special durations that we encode as a 'duration code'.

MPAA_rating_id—A hard coded rating id assigned by the Motion Picture Association of America. The value should be interpreted according to the following table:

| MPAA Rating Description | Value |
|---|---|
| MPAA rating is not available | 0 |
| Not Rated (NR) | 1 |
| MPAA General Audiences (G) | 2 |
| MPAA Parental Guidance (PG) | 3 |
| MPAA PG-13 (PG-13) | 4 |
| MPAA Restricted (R) | 5 |
| MPAA No one under 17 admitted (NC-17) | 6 |
| MPAA Adult (Adult) | 7 | star_rating_id—A hard coded star rating id used for programs. A value of 0x0 indicates that no star rating is available. The value should be interpreted according to the following table:

| Star Rating Description | Value |
|---|---|
| Star rating is not available | 0 |
| One star | 1 |
| One star and half | 2 |
| Two stars | 3 |
| Two stars and half | 4 |
| Three stars | 5 |
| Three stars and half | 6 |
| Four stars | 7 |
| Four stars and half | 8 |
| Five stars | 9 | content_warnings_flag—If set, it indicates that there will be data in this descriptor describing the content warnings associated with this program.

TV_rating_id—A hard coded rating id used for programs made for television. The value should be interpreted according to the following table:

| TV Rating Description | Value |
|---|---|
| TV rating is not available | 0 |
| TV Youth (TV-Y) | 1 |
| TV Youth-7 (TV-Y7) | 2 |
| TV General (TV-G) | 3 |
| TV Parental Guidance (TV-PG) | 4 |
| TV Parental Guidance 14 (TV-PG14) | 5 |
| TV Mature (TV-MA) | 6 | subcategory_id—The subcategory of the event. The list of currently known subcategory values can be found in Appendix A. Additional subcategories can be added via the control message short_title_length—The number of bytes in the short title for this program.

duration_code—Special 3 bit code that shortens the most typical program lengths. The actual duration in minutes is (15)*(duration_code+1)

duration_in_minutes—The exact showing duration in minutes.

num_content_warnings—The number of content warning Ids associated with this program.

content_warning_id—A list of content warnings represented as single byte lookup ids into the following table:

| Content Warnings Description | Value |
|---|---|
| Adult Content | 1 |
| Adult Humor | 2 |
| Adult Language | 3 |
| Adult Situations | 4 |
| Adult Themes | 5 |
| Brief Nudity | 6 |
| Drug Use (D) | 7 |
| Fantasy Violence (FV) | 8 |
| Graphic Language | 9 |
| Graphic Violence | 10 |
| Intense Violence | 11 |
| Intense Sexual Situations | 12 |
| Intensely Suggestive Dialogue | 13 |
| Language (L) | 14 |

-continued

| Content Warnings Description | Value |
|---|---|
| Mature Themes | 15 |
| Mild Violence | 16 |
| Nudity (N) | 17 |
| Profanity | 18 |
| Rape | 19 |
| Sexual Situations (S) | 20 |
| Strong Course Language | 21 |
| Strong Language | 22 |
| Strong Sexual Content | 23 |
| Violence (V) | 24 | short_title_char—A sequence of bytes that comprise the short title of the program.

title_index_offset—The offset modulo 256 to the title index record (in the either the Merged_Title Index Block or the corresponding Title_Index_block) which is belongs to the first airing time of this program. This is used as a hash value to quickly find all showing times for his particular program and for anchoring queries between showings and title. The showing offset is the number of index loop entries (not bytes). Title_idx_offset=title_index_block_second_letter_showing_offset % 256.

searchable_short_title—The modified (truncated) short title that will be used as sorting field in the Title Index Block. This value is constructed from the title constructed from the short_title_char loop above. This field is a string of characters, the last character in the string will have its most significant bit set—NOTE: this field is not null terminated.

The rules for constructing the short title should be configurable. For IGuide the rules are:

1) Convert accented characters to nearest equivalent (e.g. ç to c, etc.)
2) Convert to all upper case
3) Remove leading article (THE, A, AN)
4) Remove punctuation, including spaces Examples (truncated to the 5 chars):

"The Sum Of All Fears"→"SUMOF"; "Hi-5"->"HI5"; "François's Funny Farm"→"FRANC"

Events Details Block 310

The Events Details block 310 describes detailed information about events suitable for information display. The sort order for these events is irrelevant since the data is always accessed via an offset in the MSB showing descriptor. Multiple events will be included in the same DBWP block. There is no need to encode the number of records in the block header as the data will always be accessed directly via an offset provided in the MSB showing info descriptor.

The syntax of the events details block is shown in Table 9.

TABLE 9

Syntax of the events_details_block

| Syntax | No. of bits |
|---|---|
| events_details_record_block ( ) = { | |
|   start_date_time_id | 12 |
|   compression_type | 4 |
|   while (more_data_available) { | |
|     event_details_record ( ) | |
|   } | |
| } | |

The Events Details block fields are described as follows:

start_date_time_id—An id for the beginning of the time block being described. This is an index into the year, so, for example, if the time_block_length is 24, then this value is the day number of the year with January $1^{st}$ being 1 and December $31^{st}$ being either 365 or 366 depending on if the year is a leap year. Similarly if time_block_length is 6 then this value indicates how many 6 hour blocks into the year this block represents.

compression_type—The type of compression used for compressed strings in this block. Zero implies no compression, 1-15 implies use the corresponding compression algorithm as defined by the compression definitions found in the control messages.

more_data_available—This is not an actual field, it is just present to indicate that we expect as many event_details_records as necessary for the time block to continuously follow the header of the event_details block.

Table 10 shows the syntax of the event details record.

TABLE 10

Syntax of the event_details_record

| Syntax | No. of bits |
|---|---|
| event_details_record( ) = { | |
|   year | 8 |
|   event_attributes | 8 |
|   event_attributes_id | 8 |
|   description_present_flag | 1 |
|   long_title_present_flag | 1 |
|   part_of_series_flag | 1 |
|   num_names | 3 |
|   if (description_present_flag == 1) { | |
|     description_length | 10 |
|     for(int j = 0; j < description_length; j++) { | |
|       description_char | 8 |
|     } | |
|   } else { | |
|     reserved_2 | 2 |
|   } | |
|   if (long_title_present_flag==1) { | |
|     long_title_length | 8 |
|     for( int j=0; j < long_title_length; j++) { | |
|       long_title_char | 8 |
|     } | |
|   } | |
|   if (part_of_series_flag == 1) { | |
|     episode_id | 16 |
|     series_id | 32 |
|     episode_title_length | 8 |
|     for (int j=0; j < episode_tittle_length; j++) { | |
|       episode_title_char | 8 |
|     } | |
|   } | |
|   for (int i=0; i < num_names; i++) { | |
|     reserved_4 | 3 |
|     role_id | 5 |
|     first_name_names_block_offset | 20 |
|     surname_names_block_offset | 20 |
|   } | |
| } | |

The Event Details Record block fields are described as follows:

year—Production year of the event. Stored as an offset from 1900. A value of 0xFF indicates that no year data is available.

event_attributes—The value should be interpreted according to the following table:

| Attribute name | Bit Number |
|---|---|
| HDTV | 0 |
| Letterbox | 1 |
| SAP | 2 |
| Language subtitle | 3 |
| Closed captioned | 4 |
| Show in Listings | 5 |
| Part of series | 6 |
| Private_event_attribute_1 | 7 | event_attributes_id—The value should be interpreted according to the following table:

num_names—The number of names associated with the program. A name can represent an actor, director, producer, or writer.

description_length—The number of bytes that comprise the long description of the program.

description_char—A sequence of characters that form an optionally compressed detailed description or synopsis of the program.

long_title_length—The number of bytes that comprise the long title of the program.

long_title_char—A sequence of characters that form an optionally compressed title of the program.

episode_id—An identifier that is common for all programs of a given episode. It will be unique for all programs inside a given series. It will not be unique between different series.

series_id—An identifier that is common for all programs of a given series. It will be unique between different series.

| | Bit Number | | | | | | | | | | | | | | |
|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | ... | 31 |
| | | | | | | | Attribute Name | | | | | | | | |
| Attribute_ID | Premier | Season Premier | Channel Premier | Series Premier | Finale | Season Finale | Series Finale | Stereo | Dolby | Dolby 51 | Reserved | Reserved | Reserved | Reserved | ... | Reserved |
| 0 | 1 | | | | | | | | | | | | | | |
| 1 | | 1 | | | | | | | | | | | | | |
| 2 | | | 1 | | | | | | | | | | | | |
| 3 | | | | 1 | | | | | | | | | | | |
| 4 | | | | | 1 | | | | | | | | | | |
| 5 | | | | | | 1 | | | | | | | | | |
| 6 | | | | | | | 1 | | | | | | | | |
| 7 | | | | | | | | 1 | | | | | | | |
| 8 | | | | | | | | | 1 | | | | | | |
| 9 | | | | | | | | | | 1 | | | | | |
| 10 | 1 | | | | | | | 1 | | | | | | | |
| 11 | | 1 | | | | | | 1 | | | | | | | |
| 12 | | | 1 | | | | | 1 | | | | | | | |
| 13 | | | | 1 | | | | 1 | | | | | | | |
| 14 | | | | | 1 | | | 1 | | | | | | | |
| 15 | | | | | | 1 | | 1 | | | | | | | |
| 16 | | | | | | | 1 | 1 | | | | | | | |
| 17 | 1 | | | | | | | | 1 | | | | | | |
| 18 | | 1 | | | | | | | 1 | | | | | | |
| 19 | | | 1 | | | | | | 1 | | | | | | |
| 20 | | | | 1 | | | | | 1 | | | | | | |
| 21 | | | | | 1 | | | | 1 | | | | | | |
| 22 | | | | | | 1 | | | 1 | | | | | | |
| 23 | | | | | | | 1 | | 1 | | | | | | |
| 24 | 1 | | | | | | | | | 1 | | | | | |
| 25 | | 1 | | | | | | | | 1 | | | | | |
| 26 | | | 1 | | | | | | | 1 | | | | | |
| 27 | | | | 1 | | | | | | 1 | | | | | |
| 28 | | | | | 1 | | | | | 1 | | | | | |
| 29 | | | | | | 1 | | | | 1 | | | | | |
| 30 | | | | | | | 1 | | | 1 | | | | | |
| . | | | | | | | | | | | | | | | |
| 255 | | | | | | | | | | | | | | | | description_present_flag—If set, it indicates that there is a long description present for this program.

long_title_present_flag—If set, it indicates that there is a long title for this program which differs from the short title present in the showing descriptor section of the MSB.

part_of_series flag—If set, it indicates that this program is part of a series, and as such may have a series ID and an episode title present later in the record.

For example all episodes of 'Cheers' will have the same series id and no other program will have that series id.

episode_title_length—The number of bytes that comprise the title of this particular episode.

episode_title_char—A sequence of characters that form an optionally compressed title of the episode of the program.

role_id—A value that indicate which roles the associated name fulfilled for this program. The following table should be used to interpret this value, taking into consideration that the values could be added together if a single person has more than one role for the program:

| Role | Value |
|---|---|
| Actor | 1 |
| Director | 2 |
| Producer | 4 |
| Writer | 8 | first_name_names_block_offset—The number of bytes to skip from the beginning of the names block to get the name_length field for the first name. A value of 0xFFFFFF indicates that this person has no first name, as would be the case for people known by a single name (e.g. Cher)

surname_names_block_offset—The number of bytes to add to the surname_names_start field which when used as an offset to the names block gives the name_length field for the surname.

By Theme Index Block 320

The themes index block 320 is used to provide a list of programs or scheduled airings of programs that match a particular theme/subcategory id. The themes block 320 will only contain themes that actually have programs airing with that theme. The themes index 320 has two main parts: a theme offsets pool and a showing loop.

The theme offsets pool is a list of mappings from category, theme pair to an offset into the showing loop. The offset represents the number of showings to skip from the beginning of the showing loop to the first showing of a program of the given category and theme. The sort order for the offsets pool is ascending category id first then ascending theme id.

The showing loop consists of showings grouped together by category id and theme id. There is no count as to how many programs are in the loop, because we always access the pool entries by an offset from the theme pool. The last showing of a given category and theme will have a flag set so the client will know when the last matching showing is found. The sort order of the records in the event loop is first category id, then theme id, then start time, and finally user channel number.

Table 11 shows the syntax of the by-theme-index-block

TABLE 11

Syntax of the by_theme_index_block

| Syntax | No. of bits |
|---|---|
| by_theme_index_block( ) = { | |
|   start_date_time_id | 12 |
|   num_categories | 3 |
|   theme_offsets_length | 11 |
|   reserved_1 | 6 |
|   categories_bitmap | 8 |
|   for (int j=0;j<num_categories;j++) { | |
|     themes_bitmap | 128 |
|     reserved_2 | 7 |
|     category_id | 3 |
|     num_themes | 6 |
|     for (int k=0; k<num_themes;k++) { | |
|       reserved_3 | 1 |
|       theme_id | 7 |
|       theme_idx_offset | 16 |
|     } | |
|   } | |
|   while (more_data_available) { | |
|     sib_index | 12 |
|     msb_section_index | 11 |

TABLE 11-continued

Syntax of the by_theme_index_block

| Syntax | No. of bits |
|---|---|
|     theme_last_showing_flag | 1 |
|   } | |
| } | |

The By Theme Index block fields are described as follows:

start_date_time_id—An id for the beginning of the time block being described. This is an index into the year, so, for example, if the time_block_length is 24, then this value is the day number of the year with January $1^{st}$ being 1 and December $31^{st}$ being either 365 or 366 depending on if the year is a leap year. Similarly if time_block_length is 6 then this value indicates how many 6 hour blocks into the year this block represents.

num_categories—The number of different high level categories with themes that have programs airing during this time block.

theme_offsets_length—The number of bytes following the categories_bitmap field that should be skipped to get to the SIB_index field of the first showing in the showing loop.

categories_bitmap—A bitmap indicating which category ids have theme ids with showings in the showings loop during this time block. e.g. 0x0 E ='00001110' indicates that there are showings with category ids 2, 3, and 4.

themes_bitmap—A bitmap indicating which theme ids for the given category id has showings in the showings loop during this time block.

category_id—The high level category id of the showings currently indexed.

num_themes—The number of distinct themes for the current category id that have showings in this showings loop.

theme_id—The theme (or subcategory) id being indexed.

theme_idx_offset—The number of showing loop entries (not bytes!) to skip from the beginning of the showing loop to get to the first showing for this category, theme pair.

more_data_available—This is not an actual field, it is just present to indicate that we expect as many entries in the programs loop as necessary.

sib_index—Indicates for which service this showing is carried on as a 0-based index into the services information block (SIB).

msb_section_index—Indicates which program airing we are dealing with by providing a 0-based index into the corresponding MSB section.

theme_last_showing_flag—A flag indicating that this is the last showing in the showing loop for the given category and theme.

By Title Index Block 320

In order to facilitate title searches an index 320 of program ids sorted by title in ascending alphanumeric order is required. Within the MSB showing descriptor information there is a searchable title as well as the normal short title. This block 320 provides quick access to showings with a given prefix in the searchable short title. For matching prefixes greater than two characters, the set top box 140 will have to traverse through the elements in provided in this index to actually find a match. The title index has two main parts: a prefix offsets pool and a showing loop.

The prefix offsets pool provides a mapping from every character from A-Z and 0-9 and all two character combinations of those 36 characters to an offset into the showing loop.

The offset represents the number of showings from the beginning of the showing loop to skip to get to the first showing of a program starting with the selected prefix.

The showing loop consists of all the showings for the given time block sorted first by searchable title (MSB block 300), then short title (MSB block 320), then long title (Event Details block 310), then start time, then user channel number. In order to provide the capability to index either programs or individual airings of the same programs, a flag is provided in the showing loop indicating if the next showing has the exact same title as the current showing.

Table 12 shows the syntax of the by-title-index-block 320.

TABLE 12

| Syntax of the by_title_index_block | |
|---|---|
| Syntax | No. of bits |
| by_title_index_block( ) = { | |
|   start_date_time_id | 12 |
|   reserved | 4 |
|   for(int j=0;j<36;j++) { | |
|     first_char_offset | 32 |
|     for (int k=0;k<36;k++) { | |
|       second_char_offset | 16 |
|     } | |
|   } | |
|   while (more_data_available) { | |
|     sib_index | 12 |
|     msb_section_index | 11 |
|     next_showing_flag | 1 |
|   } | |
| } | |

The By Title Index block fields are described as follows:

start_date_time_id—An id for the beginning of the time block being described. This is an index into the year, so, for example, if the time_block_length is 24, then this value is the day number of the year with January 1$^{st}$ being 1 and December 31$^{st}$ being either 365 or 366 depending on if the year is a leap year.

Similarly if time_block_length is 6 then this value indicates how many 6 hour blocks into the year this block represents.

first_char_offset—The number of showings (not bytes) to skip from the beginning of the showing loop to get to the first showing that starts with the character implied by the index at which this offset appears. If no program starts with this character this field will have a value of 0xFFFFFFFF.

second_char_offset—The number of showing entries (not bytes) to skip from the event referenced by the corresponding first_char_offset value in the showing loop to get to the first showing that starts with the two letter combination. If no event starts with this two character combination, this field will have a value of 0xFFFF.

sib_index—Indicates for which service this showing is carried on as a 0-based index into the services information block (SIB).

msb_section_index—Indicates which program airing we are dealing with by providing a 0-based index into the corresponding MSB section.

next_showing_flag—If set it implies that the next showing in the showing loop has the exact same short title (master showings block) as the current showing.

By Series Index Block 320

In order to facilitate series searches and listings of all events in a given series, a mapping from series id back to a list of showings is required. Within this block 320, the showing records are sorted by series id, showing start time, sib_index and episode_id, the offset records are sorted by series_id. Note: the events within the inner loop of this block are not aligned to the appropriate byte boundary to save space. As such, the event_ids must be accessed byte by byte. We will include only "earlier" showing record in msb overlap case.

Table 13 shows the syntax of the by-series-index-block 320.

TABLE 13

| Syntax of the by_series_index_block | |
|---|---|
| Syntax | No. of bits |
| by_series_index_block( ) = { | |
|   number_of_series | 16 |
|   reserved | 16 |
|   for (j=0;j<number_of_series;j++){ | |
|     series_id | 32 |
|     series_showings_offset | 16 |
|   } | |
|   while(more_data_available){ | |
|     episode_id | 16 |
|     msb_block_index | 8 |
|     sib_index | 12 |
|     msb_section_showing_index | 11 |
|     series_last_showing_flag | 1 |
|   } | |
| } | |

The By Series Index block fields are described as follows:

number_of_series—The number of series ids that are ordered by this block.

series_id—The current series being described.

series_showings_offset—The number of showings (not bytes) to skip from the beginning of the showing loop to get to the first showing that implied by the series_id at which this offset appears.

episode_id—An identifier that is common for all programs of a given episode. It will be unique for all programs inside a given series. It will not be unique between different series.

msb_block_index—Indicates the corresponding MSB containing the referenced showing. This value will be in the inclusive range 0 to the num_time_blocks field in the FCM less one. e.g. a value of one with a time_block_length of 24 hours implies the showing is in the MSB for the second day of data.

sib_index—Indicates for which service this showing is carried on as a 0-based index into the services information block (SIB).

msb_section_showing_index—Indicates which program airing we are dealing with by providing a 0-based index into the corresponding MSB section.

series_last_showing_flag—A flag indicating that this is the last showing in the showing index loop for the given series.

Data Extension Block 310

Data extension block 310 provide extra data that is not necessary on all boxes or is currently undefined. Currently defined data extensions are described in Appendix B and include extra Movie data for event details records, images for both services and event details, and extra showings data describing the audio and broadcast quality of the showing.

Table 14 shows the syntax of the data extension block 310.

TABLE 14

Syntax of the data_extension_block

| Syntax | No. of bits |
|---|---|
| data_extension_block( ) = { | |
|   number_of_records | 16 |
|   reserved | 16 |
|   for (j=0;j<number_of_records;j++) { | |
|     data_extension_record( ) | |
|   } | |
| } | |

The Data Extension block fields are described as follows:
number_of_records—The number of data extension records contained in this object. Must be greater than 0. The format of each record is described below.

Table 15 shows the syntax of the data extension record.

TABLE 15

Syntax of the data_extension_record

| Syntax | No. of bits |
|---|---|
| data_extension_record( ) = { | |
|   extension_type | 8 |
|   original_type | 8 |
|   extension_length | 16 |
|   original_id | 32 |
|   for(j=0;j<extension_length;j++) { | |
|     extension_data_byte | 8 |
|   } | |
|   pad( ) | |
| } | |

The Data Extension Record fields are described as follows:

extension_type—The type of extension this record is describing. Together with the original type, the client DB determines whether to store this extension data or not. For each original type the extension type gives a meaning to the data that is understood by applications requesting this extension. For example, for an original type of 1 (Service Information Block), an extension type of 1 may indicate that the extension data bytes represent a VQ image that can be used as a Channel Icon.

original_type—The type of record that this data extends is reflected in this field. It uses the same meaning as the object_type field in the DBWP_Header (defined in table 1-3).

extension_length—Length, in bytes, of extension data for this record.

original_id—Uniquely identifies the record to which this extension data pertains. For example, if original type is 1 (service information block), then the original id is a service_id. Similarly, if original_type is 3 (event_details_block) then the original id is an event_id.

extension_data_byte—The next byte in the sequence of the data extension.

Merged Title Index Block 320, 340

This block is similar in purpose to the normal By Title index block 320, except it refers to more than one MSB time block. Its purpose is to combine the title blocks for the first n time blocks so that a low powered set top box 140, such as the DCT2000, does not need to merge the results from n by title indexes to provide a complete list of programs.

The determination of n should be a configuration point on the server and it should be based on the number of time blocks a low end settop box is expected to be able to store in DRAM at any one time. This is completely dependent on the size of the channel map, however for most environments a value equivalent to between 72 and 96 hours is expected.

In order to facilitate title searches an index of program ids sorted by title in ascending alphanumeric order is required. Within the MSB showing descriptor information there is a searchable title as well as the normal short title. This block provides quick access to showings with a given prefix in the searchable short title. For matching prefixes greater than two characters, the set top will have to traverse through the elements in provided in this index to actually find a match. The title index has two main parts: a prefix offsets pool 340 and a showing loop 320.

The prefix offsets pool 340 provides a mapping from every character from A-Z and 0-9 and all two character combinations of those 36 characters to an offset into the showing loop 320. The offset represents the number of showings from the beginning of the showing loop to skip to get to the first showing of a program starting with the selected prefix.

The showing loop 320 consists of all the showings for the given number of time blocks sorted first by searchable title (MSB block), then short title (MSB block), then long title (Event Details block), then start time, then user channel number. In order to provide the capability to index either programs or individual airings of the same programs, a flag is provided in the showing loop indicating if the next showing has the exact same title as the current showing.

Table 19 shows the syntax of the merged title index block 320, 340.

TABLE 19

Syntax of the merged_title_index_block

| Syntax | No. of bits |
|---|---|
| by_title_index_block( ) = { | |
|   num_time_blocks | 8 |
|   for(int j=0;j<36;j++) { | |
|     first_char_offset | 32 |
|     for (int k=0;k<36;k++) { | |
|       second_char_offset | 16 |
|     } | |
|   } | |
|   while (more_data_available) { | |
|     sib_index | 12 |
|     msb_index | 8 |
|     msb_section_index | 11 |
|     next_showing_flag | 1 |
|   } | |
| } | |

The Merged Title Index block fields are described as follows:

num_time_blocks—Indicates the number of time blocks covered by this block.

first_char_offset—The number of showings (not bytes) to skip from the beginning of the showing loop to get to the first showing that starts with the character implied by the index at which this offset appears. If no program starts with this character this field will have a value of 0xFFFFFFFF.

second_char_offset—The number of showing entries (not bytes) to skip from the showing referenced by the corresponding first_char_offset value in the showing loop to get to the first showing that starts with the two letter combination. If no event starts with this two character combination, this field will have a value of 0XFFFF.

sib_index—Indicates for which service this showing is carried on as a 0-based index into the services information block (SIB).

msb_index—Indicates the corresponding MSB number of the showing. This is a zero based index from the first available MSB. It should range from 0 to at most FCM.num_time_blocks−1.

msb_section_index—Indicates which program airing we are dealing with by providing a 0-based index into the corresponding MSB section.

next_showing_flag—If set it implies that the next showing in the showing loop corresponds to the same program with the different airing time.

By Categories Index Block 320

The categories index block 320 is almost identical to the by themes index, except it is only used for high level categories, not the individual subcategories (or themes). It is used to provide a list of programs or scheduled airings of programs that match a particular high level category id. The category index has two main parts: a category offsets pool and a showing loop.

The category offsets pool is a list of mappings from category id to an offset into the showing loop. The offset represents the number of showings to skip from the beginning of the showing loop to the first showing of a program of the given category. The sort order for the offsets pool is ascending category id.

The showing loop consists of showings grouped together by category id. There is no count as to how many programs are in the loop, because we always access the pool entries by an offset from the category offsets pool. The last showing of a given category will have a flag set so the client will know when the last matching showing is found. The sort order of the records in the event loop is first category id, then start time, and finally user channel number.

Table 20 shows the syntax of the by category index block.

TABLE 20

Syntax of the by_category_index_block

| Syntax | No. of bits |
|---|---|
| by_theme_index_block( ) = { | |
|   start_date_time_id | 12 |
|   reserved_1 | 4 |
|   num_categories | 3 |
|   reserved_2 | 5 |
|   categories_bitmap | 8 |
|   for (int j=0;j<num_categories;j++) { | |
|     reserved_3 | 5 |
|     category_id | 3 |
|     category_offset | 16 |
|   } | |
|   while (more_data_available) { | |
|     sib_index | 12 |
|     msb_section_index | 11 |
|     category_last_showing_flag | 1 |
|   } | |
| } | |

The By Category Index block fields are described as follows:

start_date_time_id—An id for the beginning of the time block being described. This is an index into the year, so, for example, if the time_block_length is 24, then this value is the day number of the year with January $1^{st}$ being 1 and December $31^{st}$ being either 365 or 366 depending on if the year is a leap year. Similarly if time_block_length is 6 then this value indicates how many 6 hour blocks into the year this block represents.

num_categories—The number of different high level categories with themes that have programs airing during this time block.

theme_offsets_length—The number of bytes following this field that should be skipped to get to the SIB_index field of the first showing in the showing loop.

categories_bitmap—A bitmap indicating which category ids have showings in the showings loop during this time block. e.g. 0x0E ='00001110' indicates that there are showings with category ids 2, 3, and 4.

category_id—The high level category id of the showings currently indexed.

category_offset—The number of showing loop entries (not bytes!) to skip from the beginning of the showing loop to get to the first showing for this category.

more_data_available—This is not an actual field, it is just present to indicate that we expect as many entries in the programs loop as necessary.

sib_index—Indicates for which service this showing is carried on as a 0-based index into the services information block (SIB).

msb_section_index—Indicates which program airing we are dealing with by providing a 0-based index into the corresponding MSB section.

category_last_showing_flag—A flag indicating that this is the last showing in the showing loop for the given category.

While the foregoing is directed to embodiments of the present invention, other and further embodiments of the invention may be devised without departing from the basic scope thereof, and the scope thereof is determined by the claims that follow.

The invention claimed is:

1. A computer implemented method, comprising:
receiving data associated with event and service information;
converting received data into processed data, wherein the processed data is in a binary format structured to be accessed directly by one or more clients, the processed data comprising data blocks, said data blocks comprising:
a base data block having an array of objects relating to respective events and services, each object in the base data block array having at least one attribute comprising an individual record of information, the objects in the base data block array being arranged in a first sorting order of the at least one attribute,
an extension data block having an extension set of attributes which provide extra detail relating to the objects in the base data block array, and
an index table having an array of objects;
sending the processed data without the received data to the one or more clients, wherein the extension data block is configured to allow a client accessing the extension data block to store the base data block without storing the extension data block; and
creating a jump table, the jump table having $n^x$ entries comprising offsets into the index table wherein n is a size of a character set used in said index table and x is a number of characters of an attribute value prefix.

2. The computer implemented method of claim 1, wherein data each object in the index table array is related to at least one of the objects in the base data block, the objects in the index table array being arranged in a second sorting order different from said first sorting order.

3. The computer implemented method of claim 1, wherein the objects in the array of the base data block are ordered according to at least one of a preferred sorting order and a typical sorting order.

4. The computer implemented method of claim 1, wherein each object in the base data block comprises at least one offset having a value which indicates the address of a next object in the array belonging to a same category.

5. The computer implemented method of claim 4, wherein the offset has a value which indicates the relative position from a present object in the array to the next object in the array belonging to the same category.

6. The computer implemented method of claim 2, wherein the converting comprises:
 creating a second index table having an array of objects, each object in the array having at least one offset, the at least one offset having a value which indicates the address of the first occurrence in the array of objects of the base data block comprising an attribute having a value which meets a certain condition.

7. The computer implemented method of claim 2, wherein sending the base data block and the index table to a client comprises sending via a cable television distribution system.

8. The computer implemented method of claim 1, comprising:
 receiving the data associated with event and service information at a server at a cable head end.

9. The computer implemented method of claim 1, wherein the objects in the array of the index table are sorted into a sorting order according to an attribute of the objects of the array of objects of the base data block, a first character of the value of the attribute comprising a character from a character set having a size of n, the jump table providing offsets to locations of prefixes of the value of the attribute, and the number of characters of the prefix for which the jump table provides offsets having a value of x.

10. The computer implemented method of claim 1, wherein the converting comprises:
 deciding which objects are included in the data block based on a time span convention, the time span convention comprising a starting time and a time period.

11. The computer implemented method of claim 10, comprising:
 choosing the time span for a given block based upon the nature of the data block.

12. A computer implemented method, comprising:
 transmitting to a client device, processed data, wherein the processed data is in a binary format structured to be accessed directly by the client device, the processed data corresponding to data associated with event and service information, and wherein the processed data comprises:
  a base data block, the base data block having an array of objects relating to respective events and services, each object in the base data block array having at least one attribute, the objects in the base data block array being arranged in a first sorting order of the at least one attribute,
  an extension data block having an extension set of attributes which provide extra detail relating to the objects in the base data block array, and
  an index table, the index table having an array of objects, each object in the index table array being related to an object in the base data block, the objects in the index table array being arranged in a second sorting order different from said first sorting order;
 receiving a request for event and service information from a client application;
 searching said array of objects in said index table based upon said request to find a requested object in said index table;
 locating a related object in said base data block related to said requested object;
 returning the related object to said client application; and
 receiving a jump table, the jump table having $n^x$ entries comprising offsets into the index table wherein n is a size of a character set used in said index table and x is a number of characters of an attribute value prefix, and
 wherein the processed data is configured to cause the client device to store the base data block of the processed data without storing the extension data block of the processed data based on information included in the extension data.

13. The computer implemented method of claim 12, comprising:
 receiving a second index table having an array of objects, each object in the array having at least one offset, the at least one offset having a value which indicates the address of the first occurrence in the array of objects of the base data block having an attribute meeting a certain condition.

14. The computer implemented method of claim 12, wherein the objects in the array of the index table are sorted into a sorting order according to an attribute of the objects of the array of objects of the base data block.

15. A computer readable medium storing computer readable instructions that when executed by a processor perform steps comprising:
 providing processed data to one or more client devices, wherein the processed data is in a binary format structured to be accessed directly by the one or more client devices, the processed data corresponding to data associated with event and service information, and wherein the processed data comprises:
  a base data block, the base data block having an array of objects relating to respective events and services, each object in the base data block array having at least one attribute comprising an individual record of information, the objects in the base data block array being arranged in a first sorting order of the at least one attribute,
  an extension data block having an extension set of attributes which provide extra detail relating to the objects in the base data block array, and
  an index table, the index table having an array of objects, each object in the index table array being related to an object in the base data block, the objects in the index table array being arranged in a second sorting order different from said first sorting order,
  wherein the extension data block includes an extension type and an original type, the extension type and the original type being configured to provide information on whether a client device is to store the base data block without storing the extension block, or to store both the base data block and the extension data block of the processed data; and
 providing a jump table, the jump table having $n^x$ entries comprising offsets into the index table wherein n is a size of a character set used in said index table and x is a number of characters of an attribute value prefix.

16. The computer readable medium of claim 15, further comprising instructions that when executed by the processor perform: providing a second index table to the one or more client devices, the second index table having an array of objects, each object in the array having at least one offset, the at least one offset having a value which indicates the address of the first occurrence in the array of objects of the base data block having an attribute meeting a certain condition.

17. The computer readable medium of claim 15, wherein the objects in the array of the index table are sorted into a sorting order according to an attribute of the objects of the array of objects of the base data block.

18. The computer implemented method of claim 1, wherein the binary format is compact.

19. The computer implemented method of claim 12, wherein the binary format is compact.

20. The computer readable medium of claim 15, wherein the binary format is compact.

21. The computer implemented method of claim 1, wherein sending the processed data without the received data to the one or more clients, further includes transmitting to one client the base data block and the extension data block for storing the base data block and the extension data block, and transmitting to another client the base data block and the extension data block for storing the base data block without the extension data block.

22. The computer implemented method of claim 1, wherein the extension data block includes extension type data and original type data, wherein the extension type data and original type data together provide an accessing client information on whether the accessing client is to store the extension data block.

23. The computer implemented method of claim 21, wherein the extension data type and original data type together provides the accessing client further information including that the extension data block represent an image.

* * * * *

UNITED STATES PATENT AND TRADEMARK OFFICE
CERTIFICATE OF CORRECTION

| | | |
|---|---|---|
| PATENT NO. | : 7,865,508 B2 | Page 1 of 1 |
| APPLICATION NO. | : 11/112738 | |
| DATED | : January 4, 2011 | |
| INVENTOR(S) | : James Matthew Hindle et al. | |

It is certified that error appears in the above-identified patent and that said Letters Patent is hereby corrected as shown below:

Column 11, Line 26:
    Delete "includes" and insert -- include --
Column 14, Line 48:
    Delete "therefor" and insert -- therefore --
Column 14, Line 53:
    Delete "programming" and insert -- programs --
Column 14, Lines 54-55:
    Delete "The order of the showings within the MSB block 300" and insert
    -- The order of the showings within the MSB section must be by start time --
Column 15, Line 16:
    Delete "Similarily" and insert -- Similarly --
Column 15, after Line 17:
    Insert -- msb_num_sections - The number of msb sections described in this block.
    This number corresponds exactly to the number of services that have programming
    described in this block. --
Column 19, Line 19:
    Delete "is"
Column 19, Line 21:
    Delete "his" and insert -- this --
Column 20, Table 10, Line 51 :
    Delete "tittle" and insert -- title --
Column 24, Line 62:
    Delete "elements in provided" and insert -- elements provided --

Signed and Sealed this

Eleventh Day of October, 2011

David J. Kappos
*Director of the United States Patent and Trademark Office*